United States Patent
Schwartz et al.

(10) Patent No.: US 6,950,503 B2
(45) Date of Patent: Sep. 27, 2005

(54) METHOD AND SYSTEM FOR FACILITATING MEDIATED COMMUNICATION

(75) Inventors: Richard L. Schwartz, Austin, TX (US); Stuart Evans, RushBury (GB)

(73) Assignee: SoloMio Corporation, Austin, TX (US)

( * ) Notice: Subject to any disclaimer, the term of this patent is extended or adjusted under 35 U.S.C. 154(b) by 295 days.

(21) Appl. No.: 09/829,515

(22) Filed: Apr. 9, 2001

(65) Prior Publication Data

US 2002/0146021 A1 Oct. 10, 2002

Related U.S. Application Data

(60) Provisional application No. 60/258,144, filed on Dec. 22, 2000.

(51) Int. Cl.[7] .............................................. H04M 11/00
(52) U.S. Cl. .................. 379/88.13; 379/93.23; 379/142.07; 379/201.1; 370/409
(58) Field of Search ...................... 379/88.13, 88.23, 379/93.23, 93.24, 142.08, 201.01, 88.14, 88.19, 88.2, 88.21, 93.17, 67.1; 370/352, 409

(56) References Cited

U.S. PATENT DOCUMENTS

| | | | | |
|---|---|---|---|---|
| 5,327,486 A | * | 7/1994 | Wolff et al. ............... | 379/93.23 |
| 5,555,376 A | | 9/1996 | Theimer et al. .......... | 395/200.09 |
| 5,758,280 A | | 5/1998 | Kimura ..................... | 455/412 |
| 5,870,454 A | | 2/1999 | Dahlen ...................... | 379/88.14 |
| 5,872,841 A | * | 2/1999 | King et al. ................ | 379/88.13 |
| 5,930,700 A | | 7/1999 | Pepper et al. .............. | 455/414 |
| 5,933,778 A | | 8/1999 | Buhrmann et al. ......... | 455/461 |
| 5,995,597 A | | 11/1999 | Woltz et al. ............... | 379/93.24 |
| 6,104,788 A | * | 8/2000 | Shaffer et al. ............ | 379/93.17 |
| 6,219,413 B1 | | 4/2001 | Burg .......................... | 379/215 |
| 6,317,485 B1 | | 11/2001 | Homan et al. ............. | 379/88.12 |
| 6,324,265 B1 | | 11/2001 | Christie, IV et al. ..... | 379/88.23 |
| 6,333,973 B1 | | 12/2001 | Smith et al. ............... | 379/88.12 |
| 6,337,858 B1 | | 1/2002 | Petty et al. ................ | 370/356 |
| 6,351,771 B1 | | 2/2002 | Craddock et al. .......... | 709/227 |
| 6,366,651 B1 | | 4/2002 | Griffith et al. ............ | 379/88.14 |
| 6,373,817 B1 | | 4/2002 | Kung et al. ................ | 370/217 |
| 6,374,246 B1 | | 4/2002 | Matsuo ....................... | 707/10 |
| 6,385,305 B1 | | 5/2002 | Gerszberg et al. ........ | 379/88.13 |
| 6,389,455 B1 | | 5/2002 | Fuisz ......................... | 709/206 |
| 6,404,860 B1 | | 6/2002 | Casellini .................. | 379/88.17 |
| 6,430,602 B1 | | 8/2002 | Kay et al. .................. | 709/206 |
| 6,477,240 B1 | * | 11/2002 | Lim et al. .................. | 379/67.1 |
| 6,477,246 B1 | | 11/2002 | Dolan et al. ............. | 379/211.02 |
| 6,489,986 B1 | | 12/2002 | Allen ........................ | 348/14.01 |
| 6,493,324 B1 | | 12/2002 | Truetken .................... | 370/261 |
| 6,498,841 B2 | * | 12/2002 | Bull et al. ............... | 379/142.08 |
| 6,564,261 B1 | | 5/2003 | Gudjonsson et al. ....... | 709/227 |
| 6,580,787 B1 | * | 6/2003 | Akhteruzzaman et al. ................. | 379/88.13 |
| 6,594,255 B1 | * | 7/2003 | Neuman .................. | 379/88.13 |
| 6,741,678 B2 | | 5/2004 | Cannell et al. .......... | 379/88.14 |
| 6,757,732 B1 | | 6/2004 | Sollee et al. ............. | 709/227 |
| 6,798,873 B2 | * | 9/2004 | Vardi et al. ............ | 379/201.01 |
| 2002/0007397 A1 | | 1/2002 | Ouzounidis et al. ........ | 709/206 |
| 2002/0023130 A1 | | 2/2002 | Stettner ..................... | 709/205 |
| 2002/0103908 A1 | | 8/2002 | Rouse et al. ............. | 709/227 |

OTHER PUBLICATIONS

PCT International Search Report PCT/US02/10918, Mar. 14, 2003.

(Continued)

*Primary Examiner*—Fan Tsang
*Assistant Examiner*—Gerald Gauthier
(74) *Attorney, Agent, or Firm*—Baker Botts L.L.P.

(57) ABSTRACT

A mediation system as disclosed herein is capable of performing a method for facilitating mediated communication. In at least one embodiment of the method for facilitating mediated communication, the method includes receiving a communication request, determining a context associated with the communication request in response to receiving the communication request, and preparing contextual decision information in response to determining the context.

29 Claims, 19 Drawing Sheets

OTHER PUBLICATIONS

PCT Written Opinion PCT/US02/10918. 10 pages, Jul. 29, 2003.

U.S. Appl. No. 09/829,538 filed Apr. 9, 2001 by Richard L. Schwartz et al. and assigned to SoloMio Corporation.

U.S. Appl. No. 09/829,784 filed Apr. 9, 2001 by Richard L. Schwartz et al. and assigned to SoloMio Corporation.

U.S. Appl. No. 09/829,512 filed Apr. 9, 2001 by Richard L. Schwartz et al. and assigned to SoloMio Corporation.

U.S. Appl. No. 09/829,516 filed Apr. 9, 2001 by Richard L. Schwartz et al. and assigned to SoloMio Corporation.

U.S. Appl. No. 09/866,373 filed May 25, 2001 by Richard L. Schwartz et al. and assigned to SoloMio Corporation.

U.S. Appl. No. 10/094,470 filed Mar. 8, 2002 by Wei–Meng Chee et al. and assigned to SoloMio Corporation.

U.S. Appl. No. 10/096,261 filed Mar. 12, 2002 by Uew Luehrig et al. and assinged to SoloMio Corporation.

* cited by examiner

| TEAM | TRUST GROUP | GENERAL | UNKNOWN CALLER |

DEFAULT ACTION
- ☐ FORWARD TO REMOTE VOICE MAIL — 123-456-AAAA
- ■ FORWARD TO ADMIN. ASSISTANT — 123-456-BBBB } D1
- ☐ FORWARD TO DEVICE MESSAGE CENTER — 123-456-CCCC
- ■ RING IF... } D2
- ☐ ALWAYS RING

"URGENT" ▼

GREETING
- ☐ STANDARD GREETING [SET-UP]
- ■ CUSTOM GREETING [SET-UP]

GROUP INDIVIDUALS

| NAME | NUMBER |
|---|---|
| JOE JOHNSON | 987-654-DDDD |
| SUSAN SMITH | 123-456-FFFF |
| TIM TAYLOR | 567-345-ZZZZ |

CO- MEDIATORS

| NAME | NUMBER |
|---|---|
| JOE JOHNSON | 987-654-DDDD |

FIGURE 4

METHOD AND SYSTEM FOR FACILITATING MEDIATED COMMUNICATION

CROSS-REFERENCE TO RELATED APPLICATION

This application is claims priority to U.S. Provisional Application Ser. No. 60/258,1444 filed on Dec. 22, 2000 by Richard L. Schwartz et al. and entitled "Method and System For Facilitating Virtual Mediation in a Voice-Data Environment."

FIELD OF THE DISCLOSURE

The disclosures herein relate generally to communication systems and more particularly to methods, systems and apparatus for facilitating virtual mediation in a voice and/or data environment.

BACKGROUND

Mobile communication devices, such as cellular telephones, two-way pagers, and wireless enabled personal digital assistants, have become mainstream. Through the use of one of these mobile communication devices, a person is accessible for participating in interactive communication as they engage in their daily activities. As a result, people are now more accessible than ever.

However, as a result of being more accessible, people are also now more unavailable for participating personally in interactive communication. In many instances, even though a person is accessible for communication, it is often inconvenient or inappropriate for the person to personally engage in interactive communication. For example, while in a meeting, a person may be accessible via their mobile communication device. However, during the meeting and for any number of reasons, it may be inappropriate or inconvenient for the person to attend personally and interactively to an inbound communication. This may be the case even though it is a telephone call or text message that the person needs to or would like to respond personally and immediately.

Call waiting, call return, voice mail, electronic assistants and unified messaging systems illustrate examples of conventional communication solutions. Such conventional communication solutions are limited in their ability to facilitate an interactive communication activity in a personalized, time-sensitive and dynamic manner when one or more participants associated with the interactive communication activity are precluded from attending personally to the interactive communication activity. Specifically, conventional solutions help with call filtering (e.g., via caller id or electronic communication assistants). These conventional solutions do not address the process of actually communicating with another party beyond facilitating manual intervention on the subscriber's part or call redirection (e.g., call forwarding or divert, follow-me). That is, they may result in a communication being redirected to another device, but do not interactively and dynamically assist with the actual communication dialog.

Therefore, a method for enabling interactive communication to be facilitated in a manner that overcomes the limitations of such conventional communication solutions would be useful.

BRIEF DESCRIPTION OF THE DRAWINGS

FIG. 4 is a diagrammatic view depicting an embodiment of a mediation subscriber policy.

DETAILED DESCRIPTION

Figure 1:
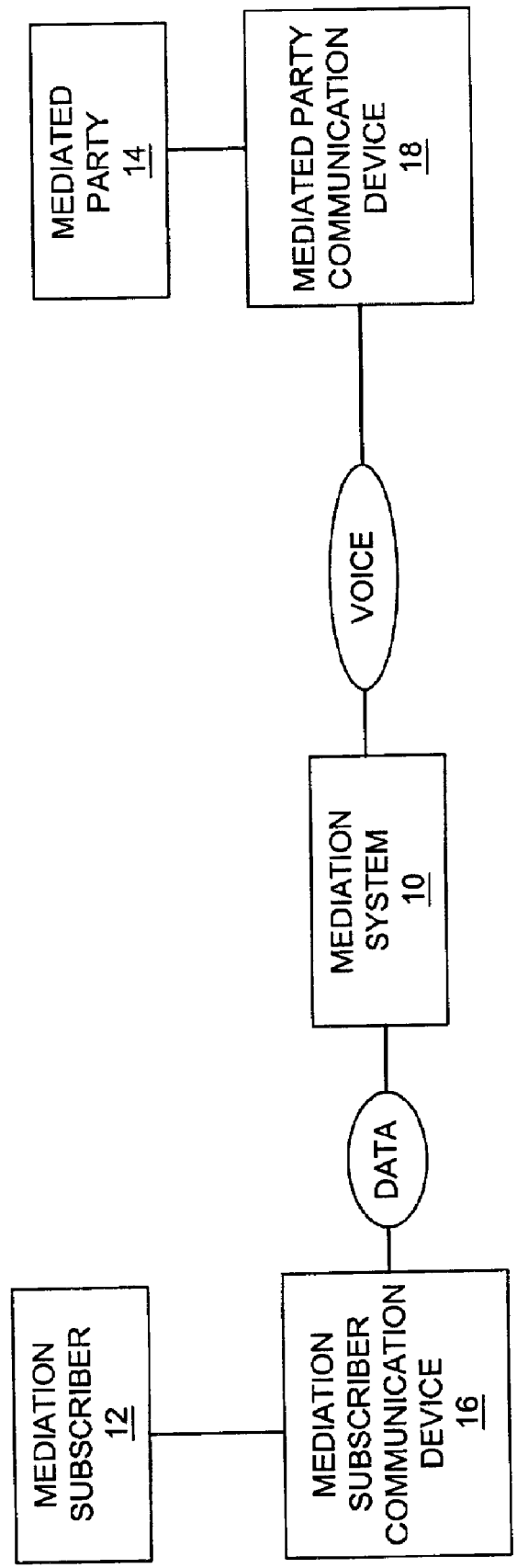
FIG. 1 is a block diagram depicting an embodiment of a communication system including a mediation system capable of mediating in an environment including voice-based and data-based communication.
Figure 2:
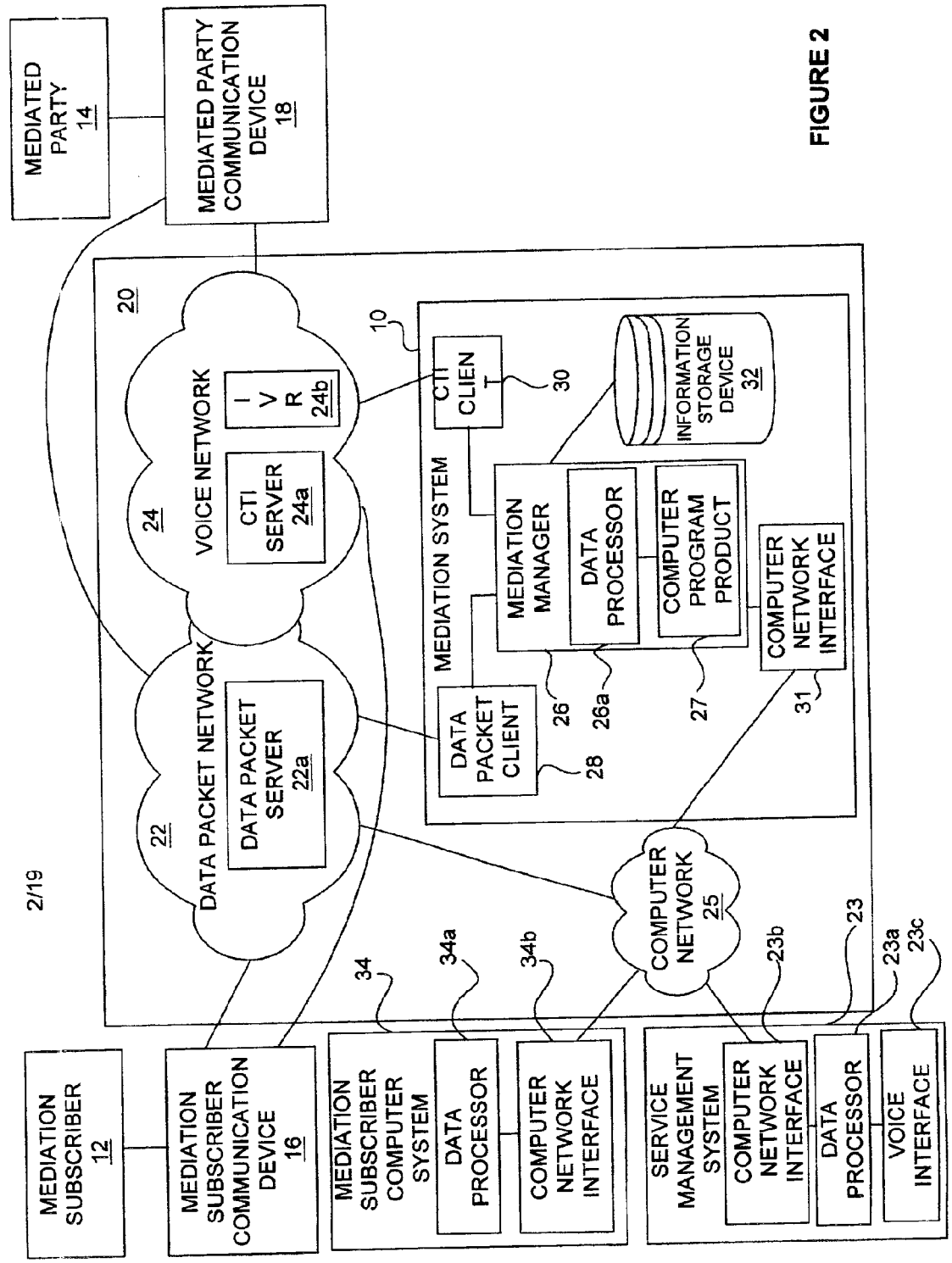
FIG. 2 is a block diagram depicting an embodiment of an apparatus capable of facilitating mediated follow-through operations via voice-based and data-based communication.

Referring to FIGS. 1 and 2, a mediation system 10 facilitates mediation between a mediation subscriber 12 and a mediated party 14. The mediation subscriber 12 communicates with the mediation system 10 through a mediation subscriber communication device 16. The mediated party 14 communicates with the mediation system 10 through a mediated party communication device 18.

As depicted in FIG. 1, communication associated with the mediation subscriber communication device 16 is facilitated in a data-based manner and communication associated with the mediated party communication device 18 is at least partially facilitated in a voice-based format. Accordingly, the mediation subscriber communication device 16 and the mediated party communication device 18 are devices capable of receiving and transmitting information in a data packet format and a voice-based format, respectively.

One aspect of the disclosure herein is that data-based communication is advantageous relative to the mediation subscriber 12 engaging in mediation activities. Specifically, data-based communication permits the mediation subscriber 12 to manage mediation activities in a time-sensitive, concise and interactive manner. Data-based communication permits the mediation party 12 to engage in mediation activities in situations where voice-based communication would be inconvenient, inappropriate or both. For example, voice-based communication proves to be a less than desirable and effective in situations such as meetings or public spaces where audibly responding to communication activities is often inconvenient and inappropriate. Through the use of data-based communication, the mediation party 12 may engage in mediation activities in a non-disruptive manner by responding in a data-based format to information presented in a data-based format.

The use of data-based communication provides a quick, less disruptive interrupt for the mediation subscriber. Responding to communications in a data-based manner rather than a voice-based manner only requires glancing down and the pushing of buttons. This type of an interruption can typically be tolerated without significantly disrupting the surrounding activities. There is no such voice-based communication equivalent for inaudibly and time-effectively responding to a communication in a voice-based manner. For example, it is time consuming to answer a call, engage the other party, explain that you are unavailable, and (for example) find out from the mediated party if you can call back when your meeting is over. In a voice-based format, this type of communication can be significant. Furthermore, call screening or other filtering systems offer little relief in this regard because they do not promote a communication with the mediated party.

One method for accomplishing data-based communication includes communicating information via data packets. General Packet Radio Service (also referred to as GPRS) is a packet-based service that allows information to be sent and received, as data packets, across networks, such as digital cellular networks, that supports GPRS. For example, a Global System for Mobile Communications (also referred to as GSM) network is one example of a digital mobile telephone network that can be configured to support GPRS. GPRS facilitates transmission of data packets between mobile communications networks and the Internet. As a result, GPRS is considered to be a sub-network of the Internet with GPRS capable mobile phones being viewed as an access device. Accordingly, access to the Internet is available to mobile users via GPRS.

Data packet network services, such as GPRS, bring together high-speed radio access and Internet Protocol (IP) based services into one, powerful environment. IP is a packet-based protocol associated with the Internet that allows active communication devices to be "on line" at all times and only pay for data that is actually sent or received. In this manner, a connection between an active communication device and the network is always present. As a result, data is sent and received more efficiently than commercially implemented switched-based protocol because a network connection does not first need to be established.

GPRS is designed for digital cellular networks (GSM, DCS, PCS, TDMA). For example, with respect to GSM networks, GPRS can be viewed as an overlay network onto second-generation GSM networks. It utilizes a packet radio principle and can be used for carrying subscriber packet data protocol information between GPRS enabled devices on GPRS compatible networks and other types of packet data networks such as the Internet. GPRS is standardized by the ETSI (European Telecommunications Standards Institute), and allows voice and data communication to share a common connection. That is, unlike current circuit-switched technology, data packets can arrive/be sent even while voice communication is active and vice versa. Accordingly a voice-based communication can be in progress while receiving and sending data and vise-versa.

Networks supporting GPSR provide an 'always-on' connection with a client device such as a smart phone. Information can be retrieved rapidly because the client device is 'always-on' in the network. Accordingly, the visual display of a GPRS enable device is sometimes referred to as an 'always-on' display.

GPRS network resources are used only when a subscriber is actually sending or receiving data. Rather than dedicating a radio channel to a GPRS subscriber for a fixed period of time, available GPRS resources can be concurrently shared between several subscribers. As GPRS is a radio resource, this efficient use of scarce radio, i.e. frequency, resources means that large numbers of GPRS subscribers can potentially share the same bandwidth and be served from a single cell. The actual number of subscribers supported depends on the application being used and how much data is being transferred.

GPRS enables mobile Internet functionality by allowing compatibility between existing Internet and GPRS compatible networks. Any service that is used over the fixed Internet today, such as File Transfer Protocol (FTP), chat, email, HTTP, and fax, are also available over GPRS compatible networks. Furthermore, because GPRS enables mobile device users to effectively and efficiently access the Internet, web browsing is a very important application for GPRS.

An embodiment of an apparatus 20 for enabling mediation activities to be facilitated by the mediation subscriber communication device 16 and the mediated party communication device 18 is depicted in FIG. 2. As illustrated, a mediation subscriber communication device 16, mediated party communication device 18, mediated party communication device 34 and service management system 23 are depicted as communicating via the apparatus 20. In practice, the apparatus 20 facilitates mediated communication for a plurality of mediation subscriber communication devices, mediated party communication devices, mediated party communication devices and service management systems.

The apparatus 20 includes the mediation system 10, a data packet network 22, a voice network 24, and a computer data network 25. The mediation system 10 is connected to the data packet network 22, to the voice network 24 and to the computer data network 25, thus enabling communication therebetween. The computer network 25 is connected to a mediation subscriber computer system 34, to the mediation manager 26 and to a service management system 23 of a service provider, thus enabling communication therebetween.

The voice network 24 includes a computer telephone interface (CTI) server 24a and an interactive voice response (IVR) system 24b. The CTI server 24a is connected to the IVR system 24b. The IVR system enables interactive voice response from the mediated party to be received by the mediation system and transformed into a computer-based communication format. Commercially available IVR systems are commercially available from IBM Corporation and from Periphonics Corporation.

In many situations, it is desirable and advantageous for the mediation subscriber communication device 16 to communicate directly with the mediated party communication device 18. In such situations, the mediation subscriber communication device communicates with the mediated party communication device without intervention by the mediation system. To facilitate data-based communication between the mediation subscriber communication system 16 and the mediated party communication device 18, the mediation subscriber communication device 16 is connected to the mediated party communication device through the data packet network 22. To facilitate voice-based communication between the mediation subscriber communication system 16 and the mediated party communication device 18, the mediation subscriber communication device 16 is connected to the mediated party communication device through the voice network 24. Accordingly, both voice and data can be passed through the mediation system without intervention, or the communication can be re-routed so that the mediation system is not in the communication path.

The mediation system 10 includes a mediation manager 26 with a data packet client 28, a computer telephone interface (CTI) client 30, a computer network interface 31 and an information storage device 32 connected thereto. A Dell PowerVault (TM) series storage device is one example of the information storage device 32. The data packet network 22 includes a data packet server 22a that enables communication between the data packet network 22 and the data manager 26 via the data packet client 28. The voice network 24 includes a computer telephone interface (CTI) server 24a that enables communication between the data packet network 22 and the mediation manager 26 via the CTI client 30.

The mediation manager 26 includes a data processor 26a, such as a network server, a workstation or other suitable type of data processing device. The computer interface 31 is connected between the data processor 26a and the computer network 25 for enabling communication therebetween. A Dell PowerEdge™ series server is one example of a suitable commercially available network server. A Dell Precision™ series workstation is one example of a suitable commercially available workstation. The information storage device 32 is connected to the data processor 26a for storing information in non-volatile memory and retrieving information therefrom.

A computer program product 27 includes a computer program that is processable by the data processor 26a of the mediation manager 26. The computer program enables facilitation of at least a portion of the operations performed by the mediation system 10 for accomplishing the methods disclosed herein. The computer program is accessible by the data processor 26a of the mediation manager 26 from an apparatus such as a diskette, a compact disk, a network storage device or other suitable apparatus.

The service management system 23 includes a data processor 23a, computer network interface 23b and a voice network interface 23c. The computer network interface 23b is connected to the computer network 25 for enabling data-based communication between the service manager 23a and the mediation system 10 via the computer network 25. The voice network interface 23c is connected to the voice network 24 for enabling voice-based communication between the service manager 23a and the mediation system 10 via the voice network 24.

The mediation subscriber computer system 34 includes a data processor 34a and a computer network interface 34b. The computer interface 34b is connected between the data processor 34a of the mediation subscriber computer system 34 and the computer network 25 for enabling communication therebetween.

A mobile telephone capable of transmitting and receiving data packets via the General Packet Radio Service (GPRS) is one example of the mediation subscriber communication device 16. GPRS enabled mobile telephones, also referred to as "Smart Phones", are offered by manufacturers such as Ericsson Incorporated and Nokia Incorporated. Smart phones are mobile phones with built-in voice, data, and Web-browsing services. Smart phones integrate mobile computing and mobile communications into a single terminal. Smart phones, importantly, can execute Java programs within the device. Java programs can be used to control presentation and interaction with the user, as well as send and receive data packets. The Ericsson models R380 and R520 telephones and the Nokia 9000 series telephone represent specific examples of GPRS enable mobile telephones.

Figure 3:
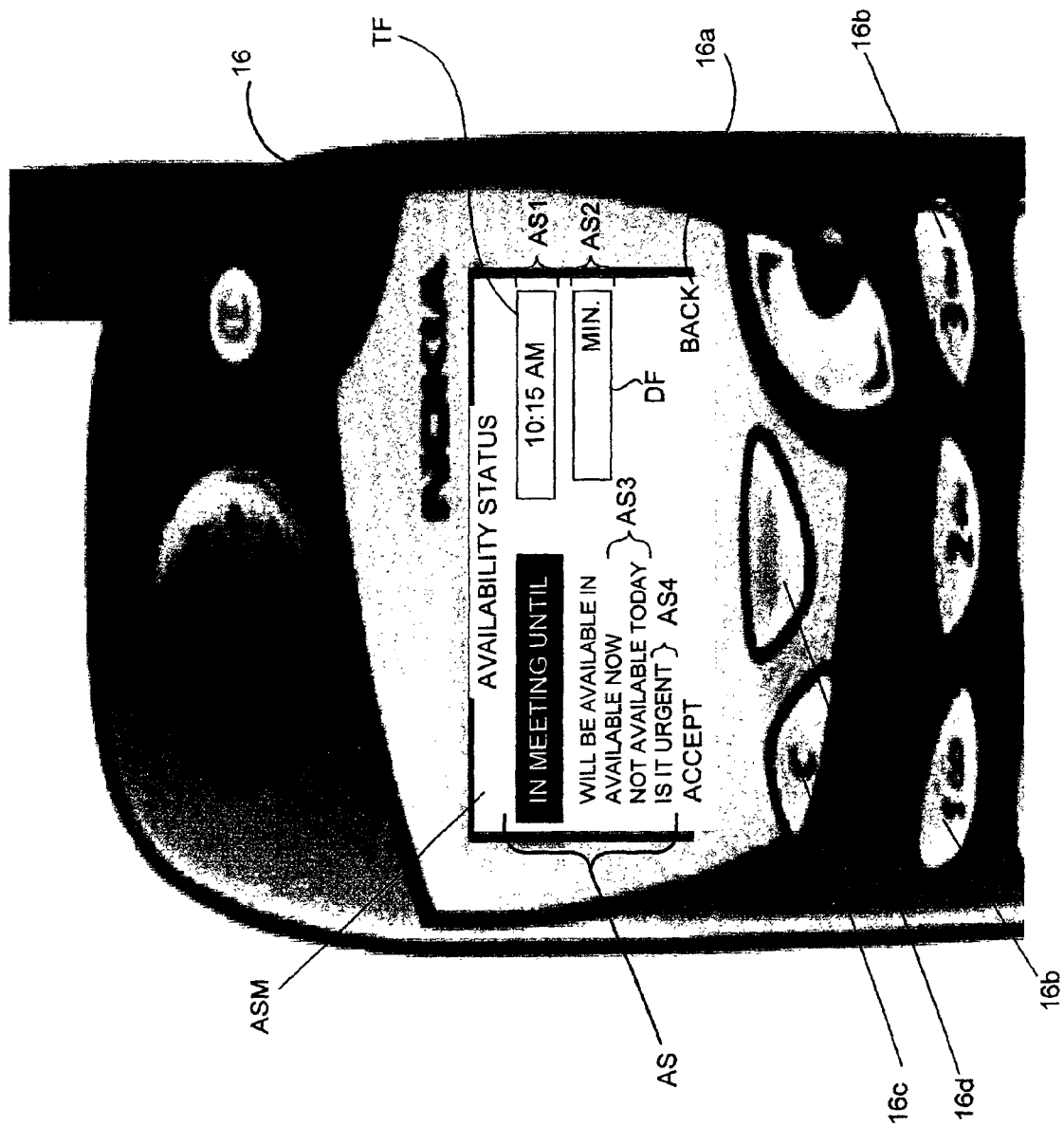
FIG. 3 is a diagrammatic view depicting an embodiment of a menu for specifying an availability status.

Referring to FIG. 3, the mediation subscriber communication device 16, such as a smart phone, include a user interface. The user interface of the device 16 includes a data interface portion and a voice interface portion. In the embodiment of the mediation subscriber communication device 16 depicted in FIG. 3, the user interface includes a visual display 16a, a plurality of alphanumeric keys 16b, a plurality of control keys 16c and a scroll key 16d. The voice interface portion of the user interface includes a speaker 16e and a microphone 16f.

The data interface portion of the user interface permits information to be visually displayed and permits the mediation subscriber to interactively manipulate information associated with data-based communications between the device 16 and the mediation system 10. The visual display 16a permits information to be visually displayed. The plurality of alphanumeric keys 16b permit alphanumeric information to be inputted. The plurality of control keys 16c permit associated functionality to be selected. For example, functional operations, such as accept and cancel, displayed on the visual display 16a may be associated with respective control keys 16c. The scroll key 16d permits menu information such as availability specifiers AS to be highlighted and manipulated.

It should be understood that other types of devices also represent suitable examples of the mediation subscriber communication device 16. Personal digital assistants (PDAs) such as those offered by Palm Computing and Handspring are data-centric devices that are capable of providing mobile wireless access. These devices can utilize GPRS through a GPRS-capable mobile phone via a serial cable or directly if they have built-in GPRS capability. Similarly, suitably equipped mobile computers are also capable of communicating data packets over a GPRS compatible network.

The apparatus, systems and devices discussed and disclosed herein permit mediation of an inbound or outbound communication to be facilitated electronically, yet in a dynamic, personalized and time-sensitive manner. In one embodiment, the methods disclosed herein are not governed exclusively by user-defined rules and designations. In these embodiments, it is advantageous for these methods to be facilitated in large degree by system-defined information. System defined information is information garnished by the mediation system in response to facilitating mediation operations. Furthermore, it is desirable to require the mediation subscriber to define and maintain only a minimal amount of designated information (also referred to herein as user-defined information).

One example of user-defined information is an availability status of the mediation subscriber. The availability status defines qualitative aspects of the mediation subscriber's availability and, in some cases, also defines quantitative aspects of the mediation subscriber's availability. As depicted in FIG. 3, an availability status menu ASM is displayable on a visual display 16a of the mediation subscriber communication device 16.

The availability status menu ASM includes a plurality of availability specifiers AS. For a first type of availability specifier AS1, a time indicating availability is specified in a time field TF. For example, the mediation subscriber may specify that he will be in a meeting until a designated time, such as 10:15AM. For a second type of availability specifier AS2, a duration quantitatively indicating availability is specified in a duration field DF. For example, the mediation subscriber specifies availability in a designated amount of time, such as 10 minutes. For a third type of availability specifier AS3, the selected availability status itself defines a relative (qualitative) time designating the availability of the mediation subscriber. For example, the mediation subscriber may designate that he is available now. For a fourth type of availability specifier AS4, the fourth type of availability specifier AS4 that queries a priority of the communication request by the mediated party. For example, the mediation subscriber may select an availability specifier that results in the urgency of the communication request being mediated by the mediation system.

Another technique for providing subscriber specified preferences and information includes the preparation of one or more policies. An embodiment of a policy 100, as viewed via visual display 34' of the mediation subscriber computer system 34, is depicted in FIG. 4. Information included in the policy 100 may be provided via the mediation subscriber communication device 16, via the mediation subscriber computer system 34, or both.

The policy 100 includes a tab 102 that may be used to specify a name for a particular group of individuals associated with the policy 100. At a group field 104, the mediation subscriber may specify one of more specific individuals that apply to the policy 100. Information such as the name and one or more telephone numbers associated with each individual is specified at the group field 104. At a greeting field 106, the mediation subscriber may designate and set-up a desired greeting. For example, the mediation subscriber may designate a standard greeting or a custom greeting. The standard greeting is a greeting that would be applied to any policy that does not specify a custom greeting. At a co-mediator field 108, the mediation subscriber may designate one or more co-mediators associated with the policy 100. Each designated co-mediator is thus authorized by the mediation subscriber to engage in mediation of a communication request received by the mediation subscriber.

Still referring to FIG. 4, the mediation subscriber may designate a default action to be performed by the mediation system in instances when a follow-up action for a particular communication is not provided by the mediation subscriber in response to being prompted for one by the mediation system. A first set of default actions D1 define actions that are taken in instances where a follow-up action by the mediation subscriber is not provided in response to the mediation system prompting the mediation subscriber for a follow-up action. For example, the mediation subscriber may designate a default action from the first set of default actions D1 for instructing the mediation system to forward applicable communications to the mediation subscriber's administrative assistant. A second set of default actions D2 defines a plurality of follow-up actions that designate an initial action associated with applicable communications. For example, the mediation subscriber may designate a default action from the second set of default actions D2 for instructing the mediation system to 'Schedule A Time To Talk' with the mediated party (team member) if a particular criteria C1 is met, such as a communication being designated as urgent.

Figure 5A:
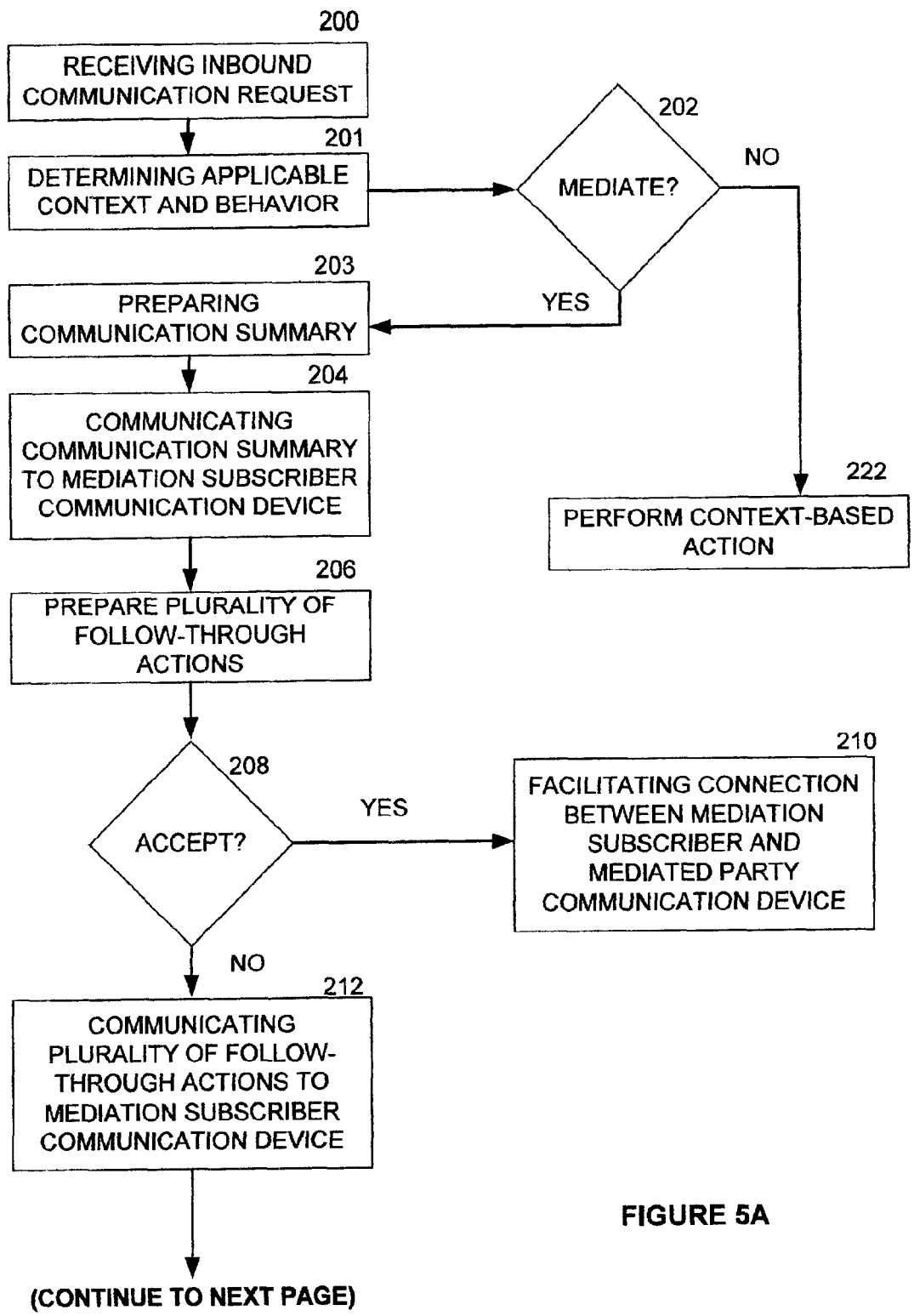
FIG. 5 is a flow chart view depicting an embodiment of a method for facilitating a mediation session initiated by an inbound communication request. See diagram on paper.
Figure 5B:
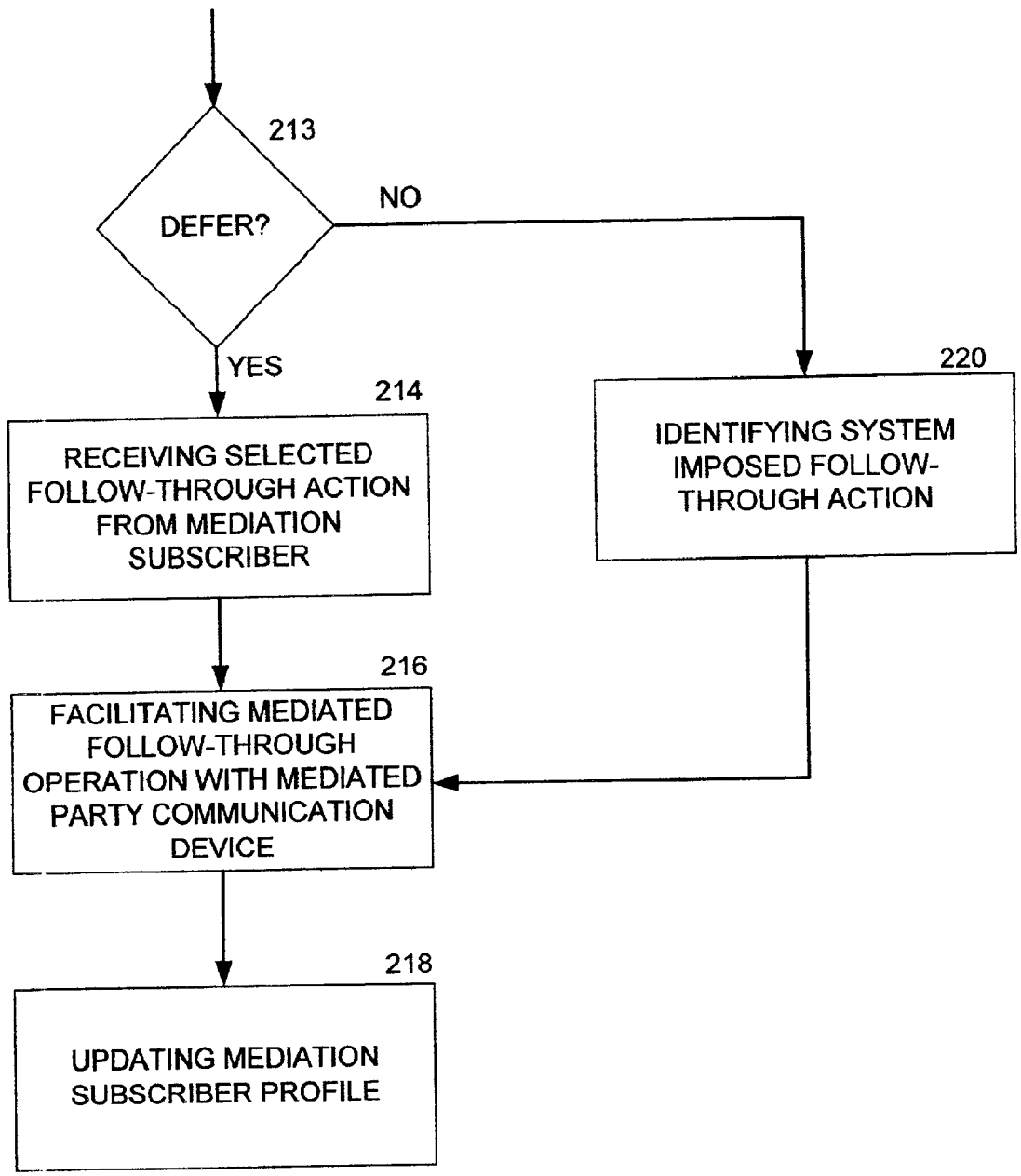

An embodiment of a method for facilitating a mediation session initiated by an inbound communication request is depicted in FIG. 5. The apparatus 20, FIG. 2, illustrates an example of an apparatus capable of carrying out the method depicted in FIG. 5. At a block 200, an inbound communication request from the mediated party communication device 18 is received by the mediation system 10. Information may be communicated between the mediation subscriber communication device and the mediation system via data packets over a suitable network. An inbound telephone call illustrates one example of the inbound communication request.

In response to receiving the inbound communication request, an applicable context and behavior information are determined at a block 201. In response to determining that a policy does not apply to the inbound communication request at a box 202, a contextual communication summary is prepared and the contextual communication summary is communicated to the mediation subscriber communication device 16 at, a block 203 and a block 204, respectively. Information provided by a carrier caller identification service, such as a caller's name and phone number and information relating to acts initiating the communication from the mediated party, such as returning a call from the mediation subscriber, may comprise a portion of the information included in the contextual communication summary. Behavior information is discussed in greater detail below. At a block 206, a plurality of follow-through actions is prepared. In other embodiments, only one follow-through action is prepared.

At a block 208, the mediation subscriber may choose to accept the inbound communication or defer the inbound communication to a mediation operation. In the case where the mediation subscriber chooses to accept the inbound communication, a connection is facilitated (block 210) between the mediation subscriber communication device and the mediated party communication device a suitable voice network, such as the voice network 24, FIG. 2. In the case where the mediation subscriber chooses to defer the associated inbound communication, at the block 213, the plurality of follow-through actions is communicated to the mediation subscriber communication device at a block 212.

It should be noted that a plurality of operations, such as communicating the contextual communication summary to the mediation subscriber and preparing the plurality of follow-through actions, may be performed concurrently. For example, mediation operations between the mediation system and the mediation subscriber may be performed while telephone is ringing. In this manner, time may be used efficiently, thus reducing the time which the mediated party is awaiting either a personal or mediated response. It should also be noted that the contextual communication summary and the follow-through actions may be communicated essentially simultaneously such that the mediation subscriber nearly immediately has all the information necessary to address the inbound communication request.

In response to the mediation subscriber selecting one of the follow-through actions, a selected follow-through action is received by the mediation system from the mediation subscriber communication device at a block 214. In response to receiving the selected follow-through action, a mediation follow-through operation is facilitated at a block 216. In response to facilitating the mediation follow-through operation, a mediation subscriber profile is updated at a block 218. As discussed below, updating the mediation subscriber profile includes updating at least one data set, such as a mediation activity data set, in a mediation subscriber profile.

In response to determining at the box 202 that a policy, such as the policy depicted in FIG. 4, does apply to the inbound communication request and determining at a block 222 that the policy requires always ringing the mediation subscriber, the method continues at the block 210. In response to determining at the block 222 that policy-driven mediated follow-through is required, the method continues at the block 216. In the case of policy-driven mediated follow-through, facilitating mediated follow-through at the block 216 is performed, at least in part, according to the follow-through action designated in the policy.

The mediated follow-through operation performed at the block 216 depicts an example of a virtual mediation operation. By virtual mediation operation, it is meant that the mediation operation is performed by the mediation system on behalf of the mediation subscriber. For example, the mediation can be performed in an automated manner by data processing device as described herein. Virtual mediation adds a high degree of personalization to acting on behalf of the mediation subscriber. To this end, the virtual mediation operation is performed based on contextual and behavioral information associated with the mediation subscriber.

It should be understood that rather than choose to accept the inbound communication or select one of the follow-through actions, the mediation subscriber may choose to do nothing (neither accept nor defer the inbound communication). By the mediation subscriber choosing to not accept the call nor to select one of the follow-through actions (block 213), a system-imposed follow-through action, such as the default action discussed above in reference to FIG. 4, is identified by the mediation system at a block 220. Accordingly, when the mediation subscriber chooses to neither accept nor defer the inbound communication, the mediation follow-through operation is facilitated according to the system imposed follow-through action.

It is also contemplated that a system-defined action based on contextual information, historical information, and behavioral information may be imposed rather than default actions associated with user-defined information. For example, the mediation subscriber is in a meeting and has received three calls from unknown parties. In all three cases, the mediation subscriber has selected a follow-through action requesting that the mediated (unknown) party schedule a time to talk. Accordingly, for all subsequent unknown callers while the mediation subscriber is in the meeting, the mediation system automatically initiates a mediated follow-through operation for scheduling a time to talk. A predefined number of occurrences may need to occur first, such as three attempts from unknown callers, prior to mediation system imposing such as system-defined follow-through action. In this example, the follow-through action imposed by the mediation system is a system-defined behavior-based follow-through action.

Example 1—Inbound Call Mediation

Figure 6:
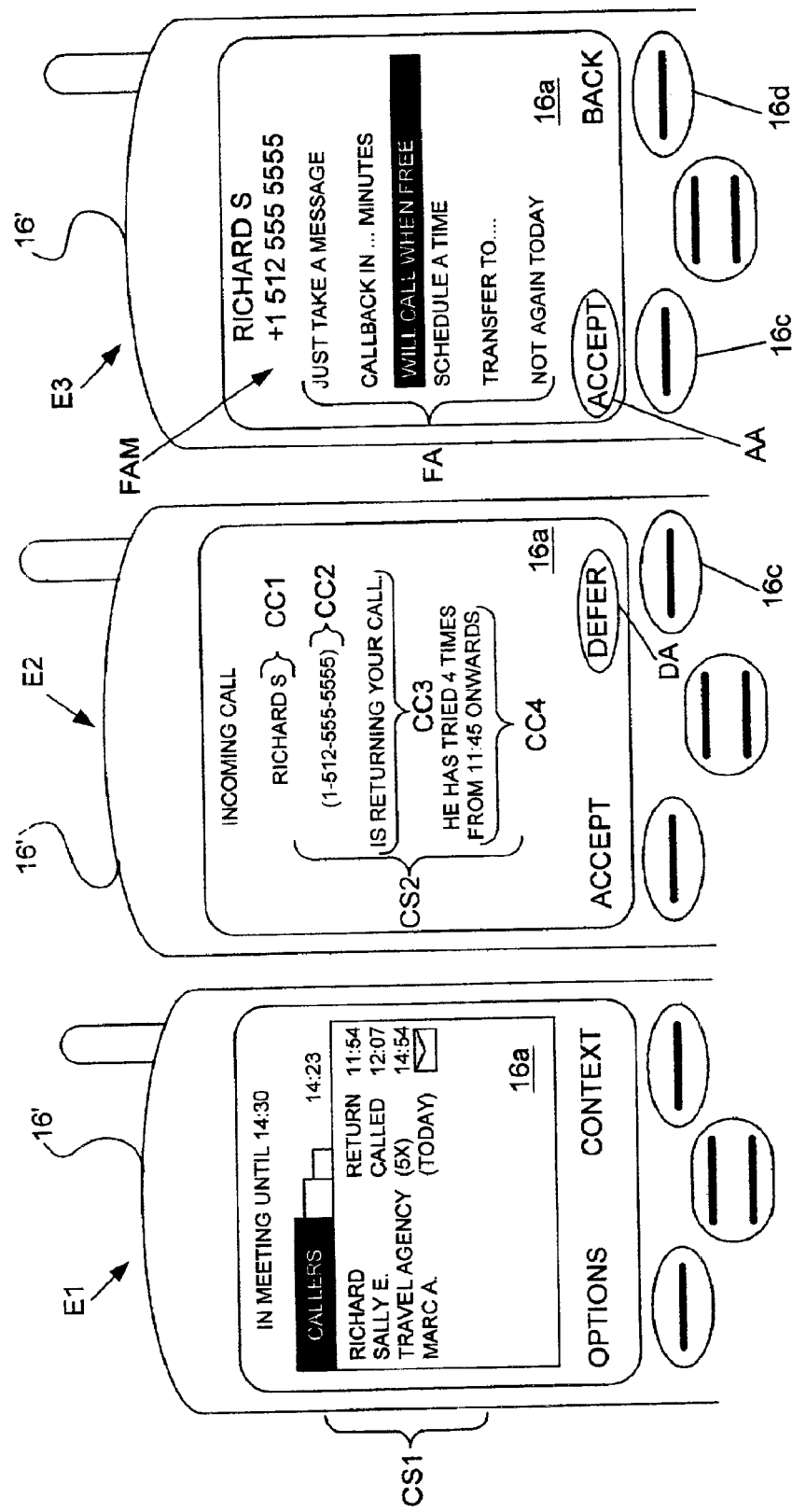
FIG. 6 is a diagrammatic view depicting an embodiment of a sequence of events associated with deferring an inbound call from a mobile telephone to a mediation system.

David is in an important meeting in which it would be seen as disruptive to verbally respond to incoming communications received on his wireless telephone 16'. As depicted in FIG. 6, at a first interaction event E1, David visually reviews a caller summary CS1. The caller summary includes contextual information associated with prior incoming calls that he has not accepted. At some prior point in time, David has communicated his availability status to the mediation system. Accordingly the mediation system knows that David is planning on being in this meeting until 14:30 hours.

After reviewing the caller summary CS1, a second interaction event E2, David receives an incoming call from Richard S. In response to receiving the incoming call, a communication summary CS2 is displayed on the visual display 16a of his wireless telephone 16'. By reviewing the communication summary CS2, David is able to quickly and non-disruptively ascertain that the incoming call is from Richard S and that Richard S has made repeated attempts to return a call from David. Because David is still in the meeting, he chooses to defer the call for virtual mediation by selecting the control key 16c associated with a defer action DA.

In response to choosing the defer action DA, a follow-through action menu FAM is displayed on the visual display 16' at a third interaction event E3. The follow-through action menu includes a plurality of follow-through actions FA. David uses the scroll key 16d to highlight the follow-through action 'Will call when free' and confirms the selection by depressing the control key 16c associated with an accept action AA.

Because David responded to the inbound communication using a data-based communication format, he was able to review the available contextual information and implement a desired follow-through action without disrupting the meeting. Furthermore, it only took David a short period or time (e.g. about 10 seconds) to review the available contextual information and implement the desired follow-through action. While David is still participating in the meeting, the mediation system has engaged in a virtual mediation operation for notifying Richard (the mediated party) that David will call him after the meeting.

As a result of David having provided his availability status to the mediation system, the mediation system uses the availability status in performing the mediation operation. The mediation system lets Richard know that David is in a meeting until 14:30 hours and will return his call after this time. In this manner, a more personalized and efficient communication is facilitated between the mediation system and Richard.

The 'schedule a time' follow-through action depicted in FIG. 6 is one embodiment of a follow-through action for mediating a coordinated arrangement for person-to-person communication to be facilitated. In such an embodiment, the mediation system mediates an agreed upon time and/or day for the mediation subscriber and the mediated party to communicate.

Context and contextual, as referred to herein, relate to experiences, actions, and information associated with a communication. For example, the contextual communication summary CS2, FIG. 6, includes a plurality of context components. A first context component CC1 is associated with a name of the mediated party. A second context component CC2 is associated with a phone number of the mediated party. A third context component CC3 is associated with the reason for the communication. A fourth context component CC4 is associated with prior attempts by the mediated party to contact the mediation subscriber.

Together, these context components CC1–CC4 provide the mediation subscriber with a brief yet insightful summary of the inbound communication. In other embodiments, the contextual communication summary includes only one context component, such as the phone number of the mediated party. The actions of the mediation subscriber and the mediated party result in an abundance of contextual information associated with the inbound communication being generated. Furthermore, completed and on-going mediation operations generate information associated with such mediation operations. Such information is useful in determining system-defined information, such as system-defined default actions mentioned above.

It will be appreciated that, in addition to the contexts previously discussed, there are many other types of contextual data that may be used to control communication between parties. Table 1 lists specific context types and embodiments. Accordingly, mediation steps can be based upon the various contexts described herein, including those of Table 1.

TABLE 1

| | |
|---|---|
| Presence | Presence of one or more parties to a mediation communication. The Presence of a party defines their availability for communication via various channels (eg phone or Instant Messaging (chat). Presence may be set by the party (ie they choose NOT to be available, or by physical limitations (out of range). Presence identifies what channels a user can be reached via at any given time |
| Location | The location of one or more parties to a mediated communication. The location will generally be the location of the mediation device, and in one embodiment, can be determined automatically based data available to the wireless communications system, or other positioning system such as a Global Positioning System. In another implementation, a party can manually specify their location or an alternate location. |
| Time | Time that the party is in. For the subscriber, this could be with respect to Mediation policies ("deny all business calls after 7 pm" or "Deny all calls when I am busy") and also for managing or warning about scheduled meetings ("Incoming call from Sally, but you have a meeting in 5 minutes") |
| Identity | Identity and number/address that Mediated party is using. For the subscriber, this could be with respect to Mediation policies ("deny all calls unless it's Sally") |
| Communication History | The history of communication interactions and follow through actions between caller and subscriber may influence the options (or priority) of options to be taken |
| Membership | The membership of a caller, as organized in the subscribers address book may influence which policies of mediation apply. E.g. "Deny all business calls after 7 pm" means if caller has been assigned as a "business" caller then deny their call after 7 pm. |

It will be further appreciated that, in addition to those mediation actions and follow-through mediation actions described, there are many other types of actions that may be used to control communication between parties. Table 2 indicates specific action types and embodiments.

information can be associated. For example, in one embodiment, it is desirable and advantageous to relate a particular communication from a mediated party with a corresponding follow-through action and availability. Relating such information supports determining context, history

TABLE 2

| | |
|---|---|
| Forward Call | A party to a mediated communication can request the call be forwarded to a different party, such as an assistant. |
| Leave Message | A party to a mediated communication can request that caller be asked to leave a message. |
| Request call back or message (VM/SMS/Email) | Subscriber may, via the mediation service, request the caller calls later (e.g. when both a free) or send a simple message via certain channels. |
| Promise to call back | Subscriber may, via the mediation service, tell the caller that they will return the call in due course |
| Schedule a meeting (conf call or other) | Subscriber may, via the mediation service, request that the caller arrange a time (when both a free) to talk |
| Use Internet Chat (Instant Messaging) | Subscriber may, via the mediation service, suggest transferring the form of communication to on-line chat (when they are in a conference for example) |
| Deny call, side effecting policy change | Deny the call to the user, but at the same time defining a policy or rule that will affect subsequent calls from that caller (e.g. "No more calls from him today") |
| Deny call and send message | Deny the call to the user (e.g. in a meeting), but opt to send them a text message. |
| Deny call and send "canned" message | Deny the call to the user but select a "canned/pre-recorded" message to be displayed or "read" to the call |
| Ask a question | Defer taking the call, but via the mediation service ask a question to the caller. E.g. "Is it important?". |

Figure 7:
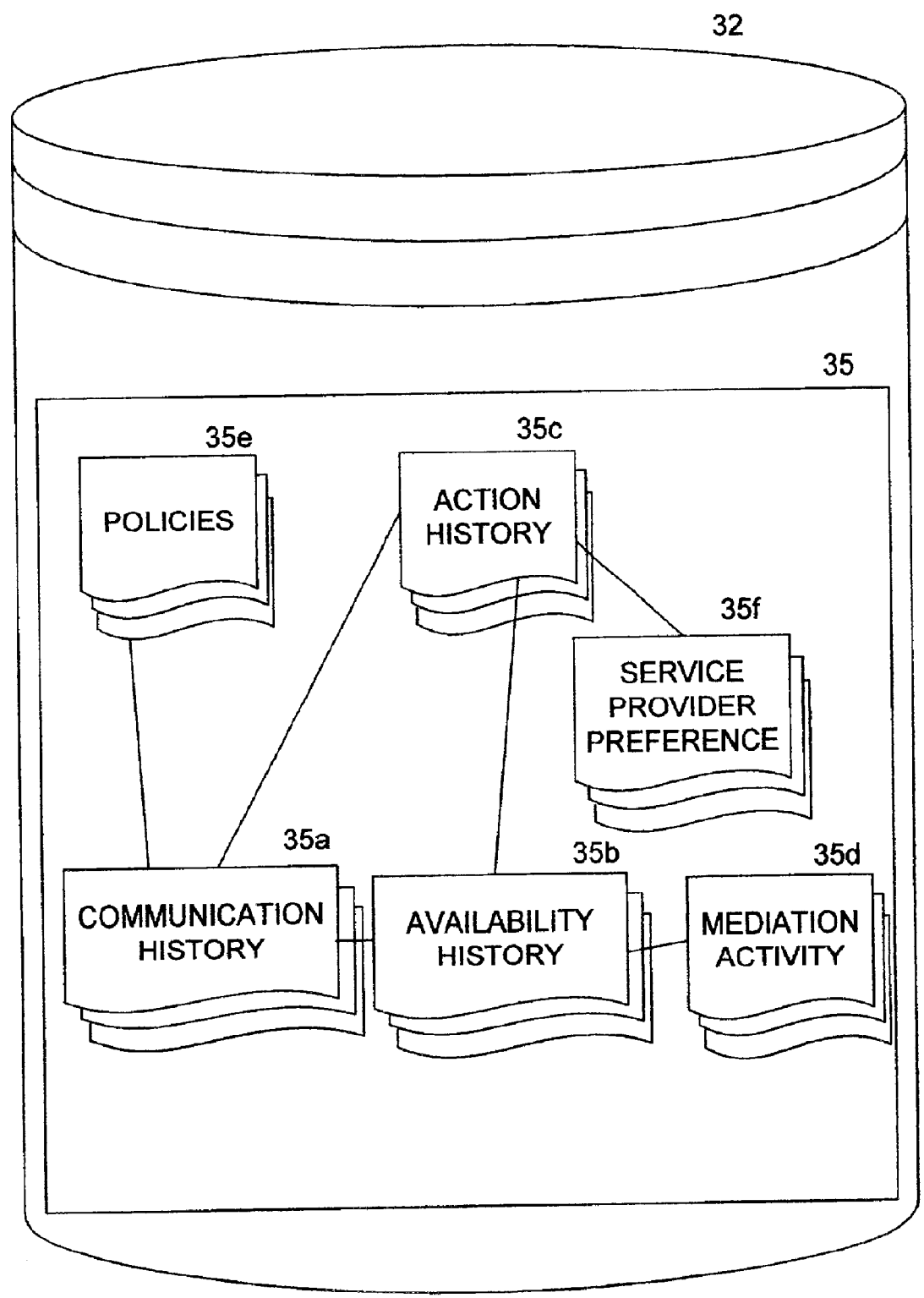
FIG. 7 is a block diagram view depicting an embodiment of a mediation subscriber profile including a plurality of information data sets.

An embodiment of the mediation subscriber profile 35 is illustrated in FIG. 7. The mediation subscriber profile 35 is stored on the data storage device 32 of the mediation system 10. The mediation subscriber profile 35 includes one or more data sets. A communication history data set 35*a* includes communication history information, such as the name and telephone number of the party associated with the communication. An availability history data set 35*b* includes availability history information of the mediation subscriber. An action history data set 35*c* includes follow-through action history information. A mediation activity data set 35*d* includes information relating to completed or in-progress mediated activities. A policies data set 35*e* includes the policies discussed above. A service provider data set 35*f* includes information such as preferences (i.e. type of room, type of food, etc) relating to mediated service that can be requested by the mediation subscriber.

Each one of the profile data sets 35*a*–35*f* can be associated with at least one other profile data set such that related and mediation status associated with a particular communication. It should also be understood that the data sets might be each maintained in separate databases or in a common database along the system depicted in FIG. 2. In addition, the data sets can have information specific to either the mediation subscriber or the mediated party being mediated, i.e. the caller. For example, the action history data set 35*c* can have a history of actions taken by either the mediated party or the mediation subscriber.

It is one aspect of the apparatus, methods and systems disclosed herein that the information archived in the mediation subscriber profile 35 may be used to gain insight into behaviors and preferences of the mediation subscriber with respect to handling inbound and outbound communications. Determining such behaviors and preferences is desirable and advantageous. In this manner, mediation operations may be carried-out dynamically and time-efficiently.

Figure 8:
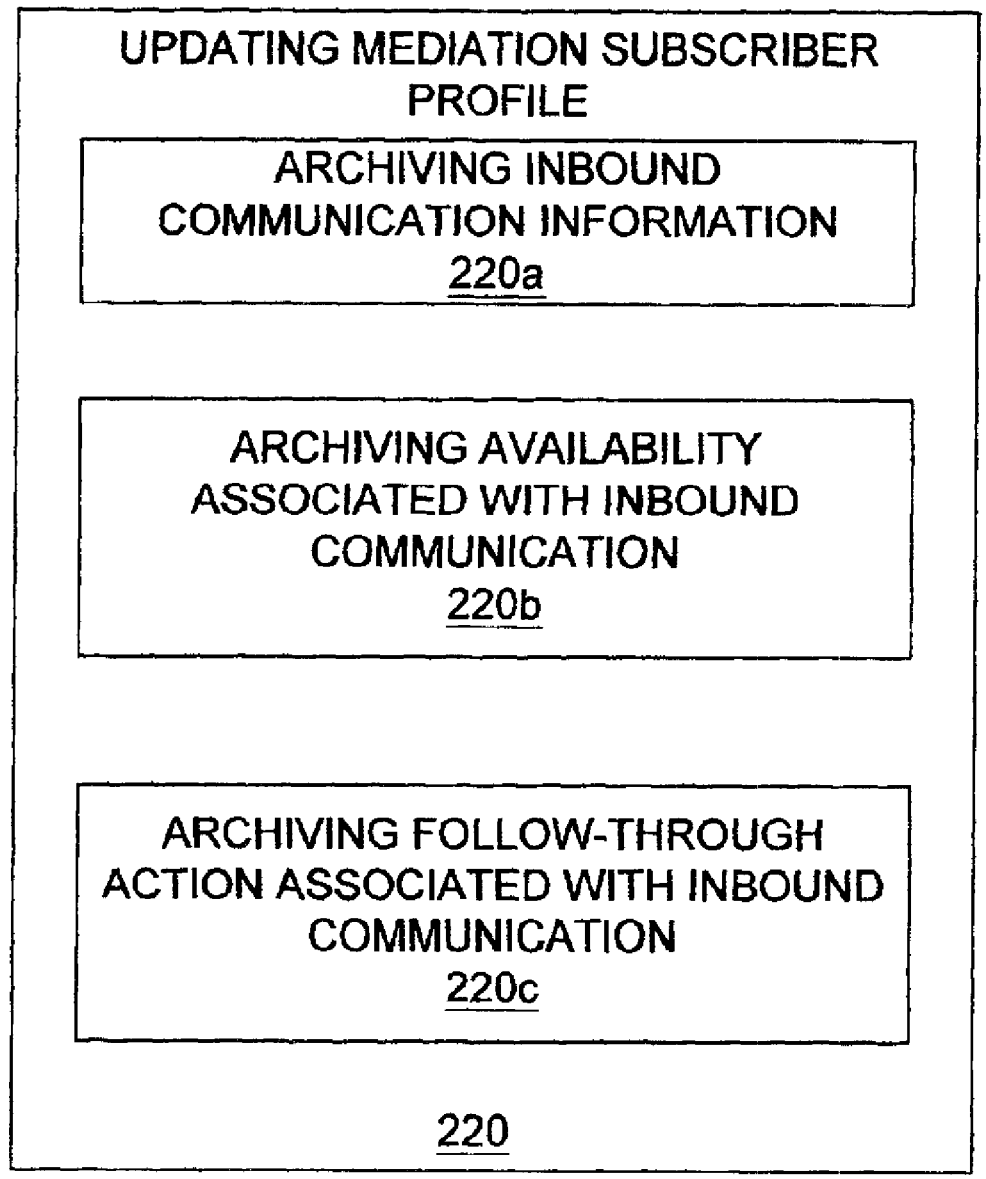
FIG. 8 is a diagrammatic view depicting an embodiment of steps for performing an operation of updating the subscriber profile.

Referring to FIG. 8, an embodiment of steps for performing the operation of updating the mediation subscriber profile 35 at the block 218 in FIG. 5 is depicted. The steps for performing the operation of updating the mediation subscriber profile 35 include archiving inbound communication information (block 220a), archiving the availability status of the mediation subscriber at the time of receiving the inbound communication (block 220b), and archiving any corresponding follow-up action (block 220c). Examples of the inbound communication information includes a time of receipt of the inbound communication, a name of the mediated party, a telephone number associated with the inbound communication. Archiving is defined herein to include forming relationships between information as discussed above in reference to FIG. 7.

Figure 9:
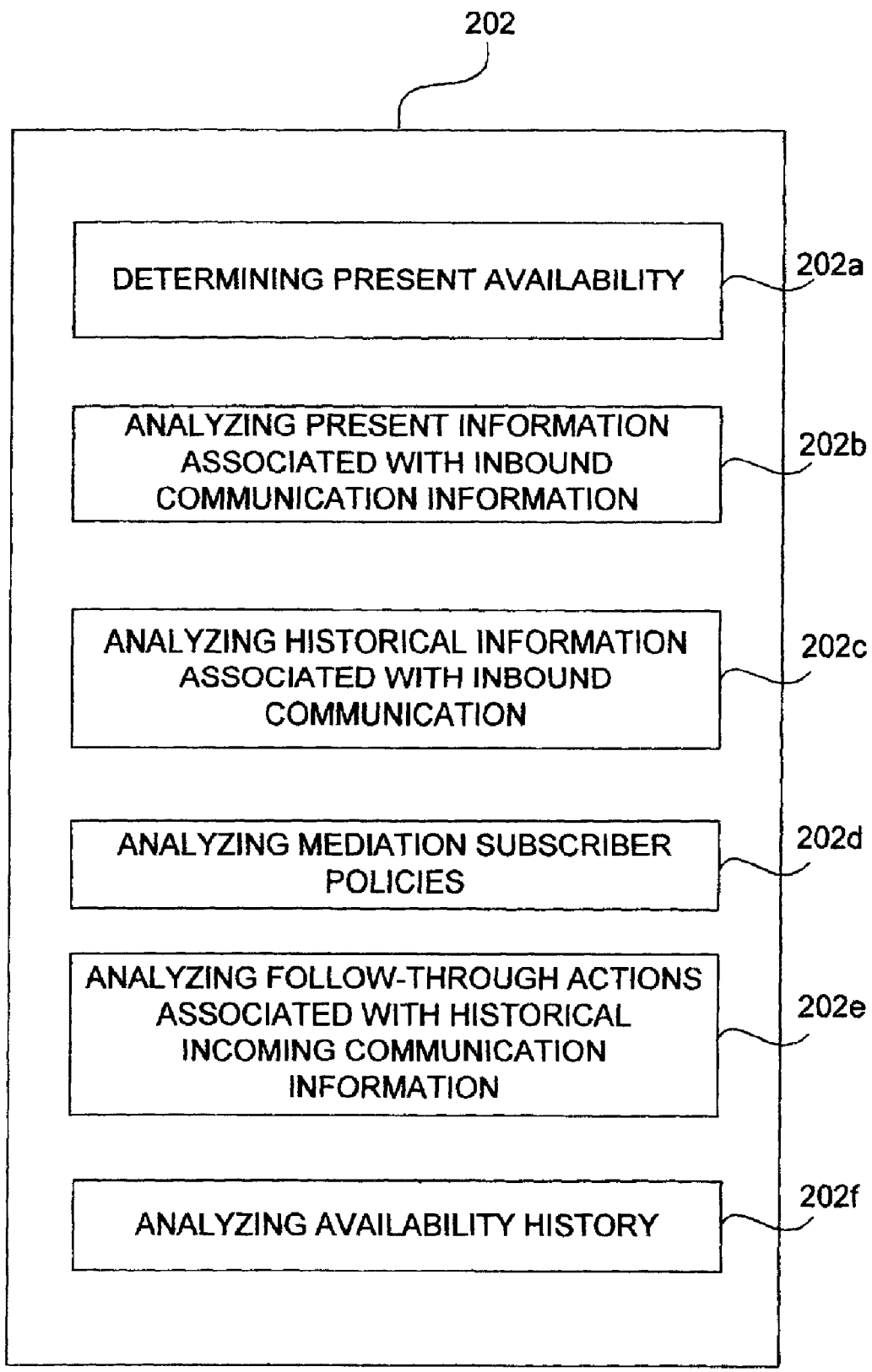
FIG. 9 is a diagrammatic view depicting an embodiment of steps for determining context and behavior to facilitate the preparation of follow-through actions.

FIG. 9 depicts an embodiment of a method for accomplishing the operation of determining applicable context and behavior by the mediated party, as depicted at the block 202 in FIG. 5. One example of determining the context associated with the inbound communication includes determining a present availability of the mediation subscriber (block 202a), analyzing present information associated with the inbound communication (block 202b), and analyzing historical information, such as from the mediation subscriber profile, that is associated with the inbound communication (block 202c). One example of determining a related behavior includes analyzing mediation subscriber policies (block 202d), analyzing follow-through actions associated with historical inbound communication information (block 202e) and analyzing availability history of the mediation subscriber (block 202c). All of the information analyzed at the block 202 is archived in the mediation subscriber profile discussed above.

Figure 10:
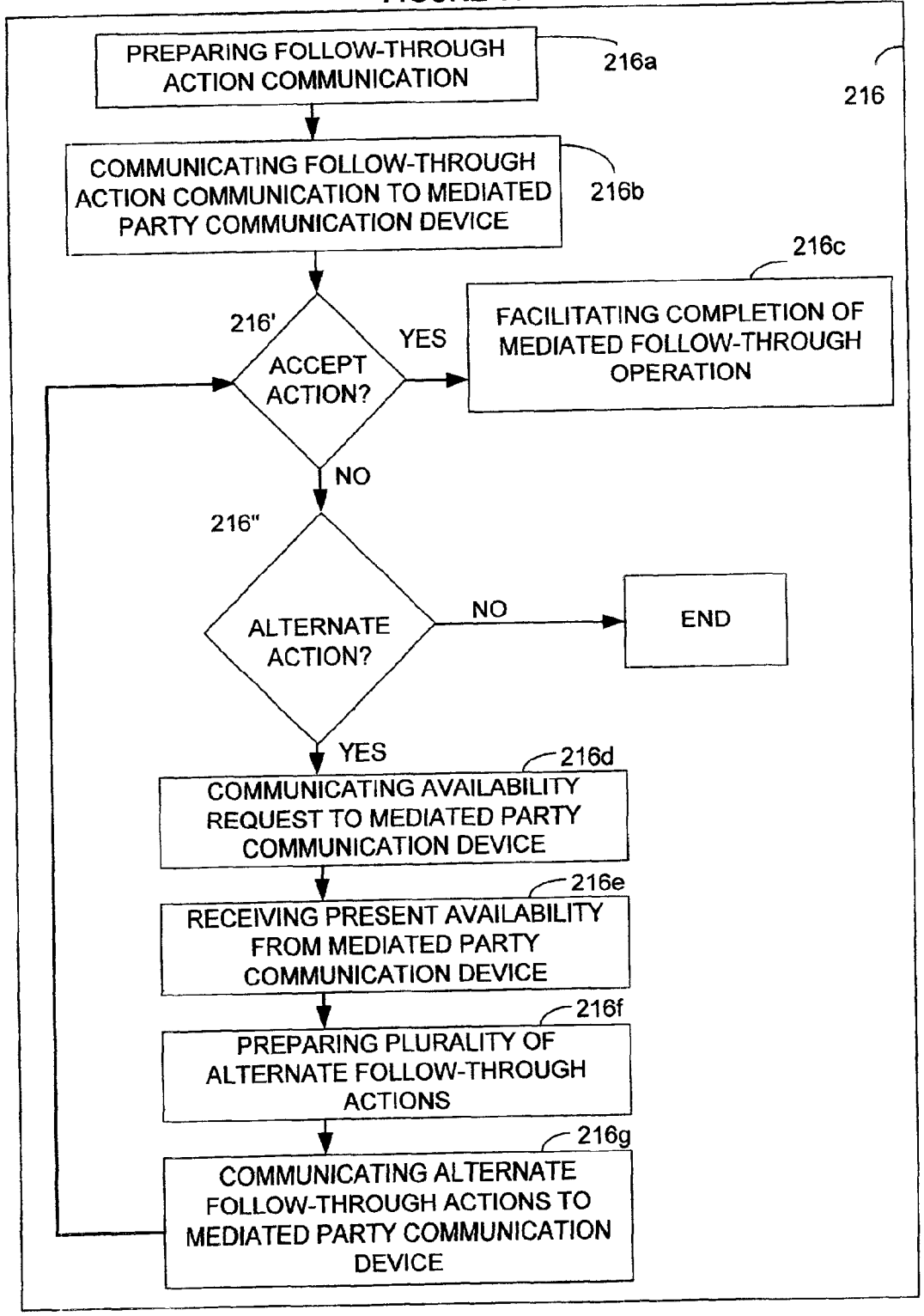
FIG. 10 is a flow chart view depicting an embodiment of a method for facilitating a mediated follow-through operation.

FIG. 10 depicts an embodiment of a method for accomplishing the operation of facilitating a mediated follow-through operation, as depicted at the block 216 in FIG. 5. At a block 216a, a follow-through action communication is prepared. In one embodiment, the follow-through action communication is voice based. The follow-through action communication is communicated to the mediated party communication device at the block 216b. In response to the selected follow-through action being accepted by the mediated party at a block 216', completion of the selected follow-through action is facilitated by the mediation system at a block 216c. In response to the selected follow-through action being unaccepted able or non-actionable by the mediated party, at a block 216", the mediated party may choose to terminate the communication, such as by hanging-up, or to suggest a revised follow-through action.

In response to suggesting an alternate follow-through action at the block 216", an availability request is communicated to the mediated party at a block 216d. Prompting the mediated party to reply with how long they will be available, when they will be available, or the like are examples of communicating the availability request to the mediated party communication device. At a block 216e, a present availability is received from the mediated party. The present availability may be received from the mediated party in a voice-based format or as data entered using a device, such as a telephone keypad. At a block 216f, a plurality of alternate follow-through actions is prepared. In other embodiments, only one alternate follow-through action is prepared. Preparing the alternate follow-through actions includes assessing information such as the present availability of the mediated party, the present availability of the mediation subscriber, communication history, policies, etc.

It is contemplated that these alternate follow-through actions may include all or some of the non-selected follow-through actions previously sent to the mediation subscriber at the block 212 in FIG. 5. Additionally, it is contemplated that all or some of the alternate follow-through actions may be availability-defined follow-through actions. By availability-defined follow-through actions, it is meant that the availability of the mediation subscriber and/or the availability of the mediated party define a specific follow-through action. A call-back time based on joint availability of the mediation subscriber and the mediated party illustrates an example of the availability-defined follow-through actions.

At a block 216g, the plurality of alternate follow-through actions is communicated to the mediation subscriber communication device and the method continues at the block 216'. In response to the mediated party accepting one of the alternate follow-through actions at the block 216', the method continued at the block 216c. In response to the mediated party not accepting one of the alternate follow-through actions at the block 216', the method continues at the block 216".

Example 2—Performing Mediated Follow-through Operation

In response to David selecting the 'Will call when free' follow-through action (see Example 1), the mediation system engages in the following voice based communication with the Richard, via the IVR system. "Richard, I am unavailable to talk with you right now, but will call you as soon as I am out of my meeting. I expect to be out of me meeting at 14:30 hours. If you will be available at around this time, please press 1. If you will not be available at about this time, please press 2". The communication with the mediated party may be in David's actual voice, a synthesized voice or other type of voice format.

In the instance in which Richard S. is available at this time, he responds accordingly by pressing 1. In response to Richard S. responding that he is available at this time, the mediation system communicates the following confirmation message to Richard S and then terminated the call. "Richard, I'll be call you shortly after 14:30 hours. I look forward to talking with you then. Good-bye."

In the instance in which Richard is not available at this time, he responds accordingly by depressing 2. The mediation system then engages in the following voice-based communication with the Richard, via the IVR system, in an attempt to proceed according to an alternate and mutually acceptable follow-through action. "Richard, I would like to connect with you. After the tone, please key in a time that you are available to talk so that I can attempt to accommodate your schedule." After the tone, Richard uses the telephone keypad to enter a time, such as 15:45 hours. In some instances, it may be desirable to use voice recognition for receiving contextual information and responses from Richard.

In response to receiving the time specified by Richard, the mediation system communicates a data-based communication to David. The data-based communication is a single follow-through action prompting David with "Are you available to talk with Richard at this time?" In the instance in which David is available to talk with Richard at the time specified by Richard, he confirms that he is available by depressing the control key corresponding to the accept action. In response to David confirming that he is available at the time specified by Richard, the mediation system communicates the following voice-based communication to Richard and terminates the call. "Richard, I am available to talk with you at this time. I will call you at around 15:45 hours. Thanks and I'll talk to you soon. Good-bye."

In the instance in which David is not available to talk with Richard at the time specified by Richard, he indicates that he is not available by depressing the control key corresponding to a decline action. In response to David indicating that he is not available at the time specified by Richard, the mediation system communicates the following voice-based communication to Richard and terminates the call. "Richard, I am not available to talk with you at this time. I'll follow-up with you later to try and find a convenient time to talk. Thanks for calling. Good-bye." In some instances, the mediation system may allow Richard to be transferred to David's assistant, such that mediation can be continued via David's assistant.

Figure 11:
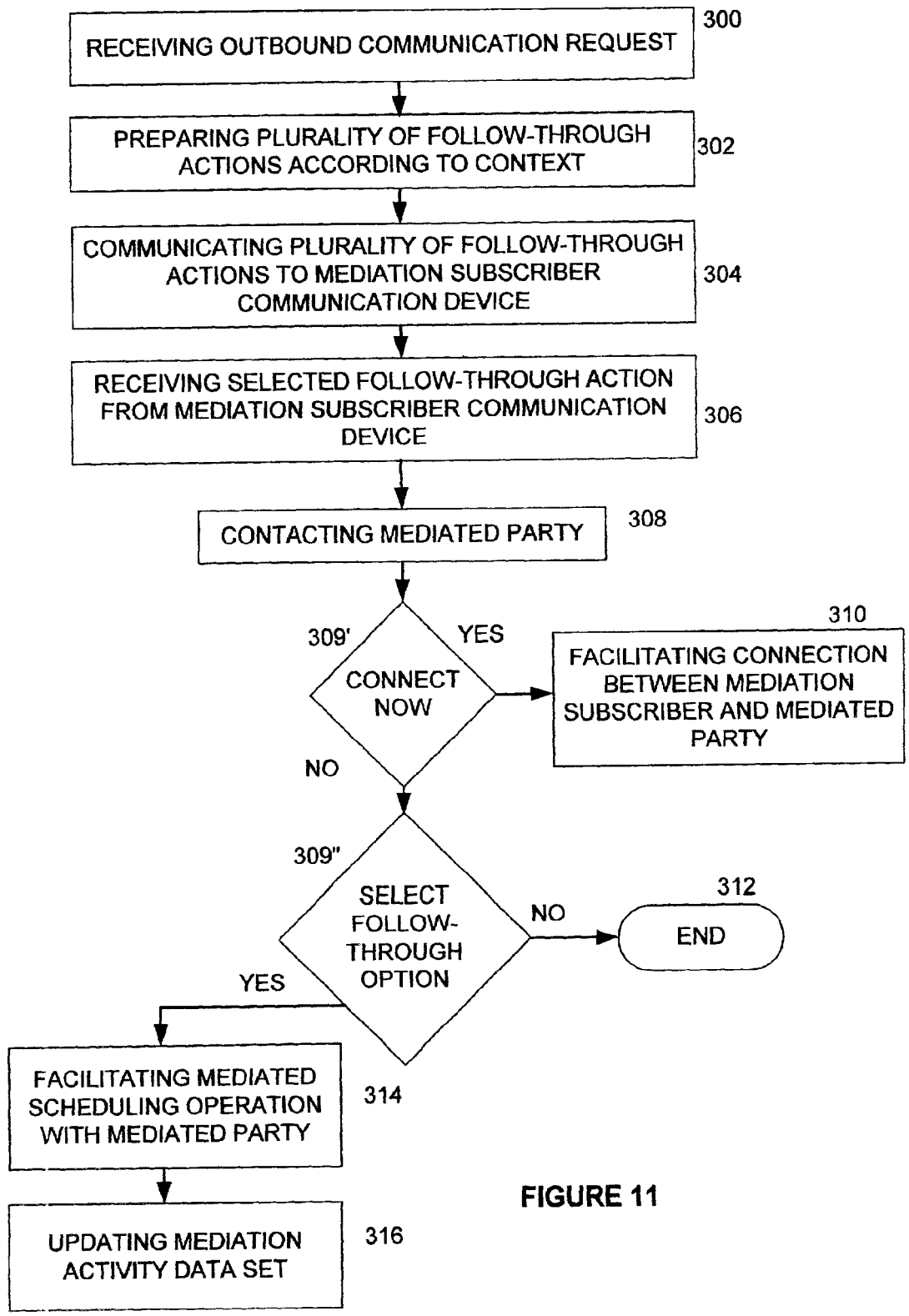
FIG. 11 is a flow chart view depicting an embodiment of a method for facilitating a mediation session initiated by an outbound communication request.

Another type of mediation session is one initiated by an outbound communication request. An embodiment of a method for facilitating a mediation session initiated by an outbound communication request is depicted in FIG. 11. The apparatus 20, FIG. 2, illustrates an example of an apparatus capable of carrying out the method depicted in FIG. 11. At a block 300, an outbound communication request is received by the mediation system from the mediation subscriber communication device, via one or more data packets or via a voice-based communication. The outbound communication request includes contact information such as a name, a telephone number, etc. for identifying an/or contacting the mediated party. In response to receiving the outbound communication request, a plurality of follow-through actions is prepared at a block 302. In other embodiments, depending on the outbound request, only one follow-through action or no follow-through action is prepared. Preparing the follow-through actions includes assessing related contextual information such as the present availability of the mediation subscriber, mediation behavior and preferences of the mediation subscriber, information in policies of the mediation subscriber, etc.

At a block 304, the plurality of follow-through actions is communicated to the mediation subscriber from the mediations system. At a block 306, a selected follow-through action is received by the mediation system from the mediation subscriber. In response to receiving the selected follow-through action, the mediated party communication device is contacted at the block 308. It should be understood that the mediation system contacts the mediated party communication device. Accordingly, the mediation system engages in communication with the mediated party to determine if the mediated party is available to engage in communication with the mediation subscriber.

In response to the availability of the mediated party and the mediation subscriber permitting immediate communication (block 309'), the mediation system facilitates connection of the mediation subscriber communication device with that of the mediated party communication device at a block 310. In response to the availability of mediated party or the mediation subscriber not permitting communication immediately therebetween (block 309'), the mediation continues to a block 309".

At the block 309", in response to the mediated party not selecting a follow-through option, the mediation system terminates its communication with the mediated party at a block 312. In response to the mediated party selecting a follow-through option at the block 309" the mediation system facilitates, block 314, a mediated follow-through operation with the mediated party according to the follow-through option selected at the block 309". Scheduling time to talk, call forwarding, entering voice mail and the like are examples of follow-through options that may be selected at the block 309". At a block 316, the mediation activity data set 35d, FIG. 7, is updated with information associated with the communication appointment.

Example 3—Outbound Call Mediation

Figure 12:
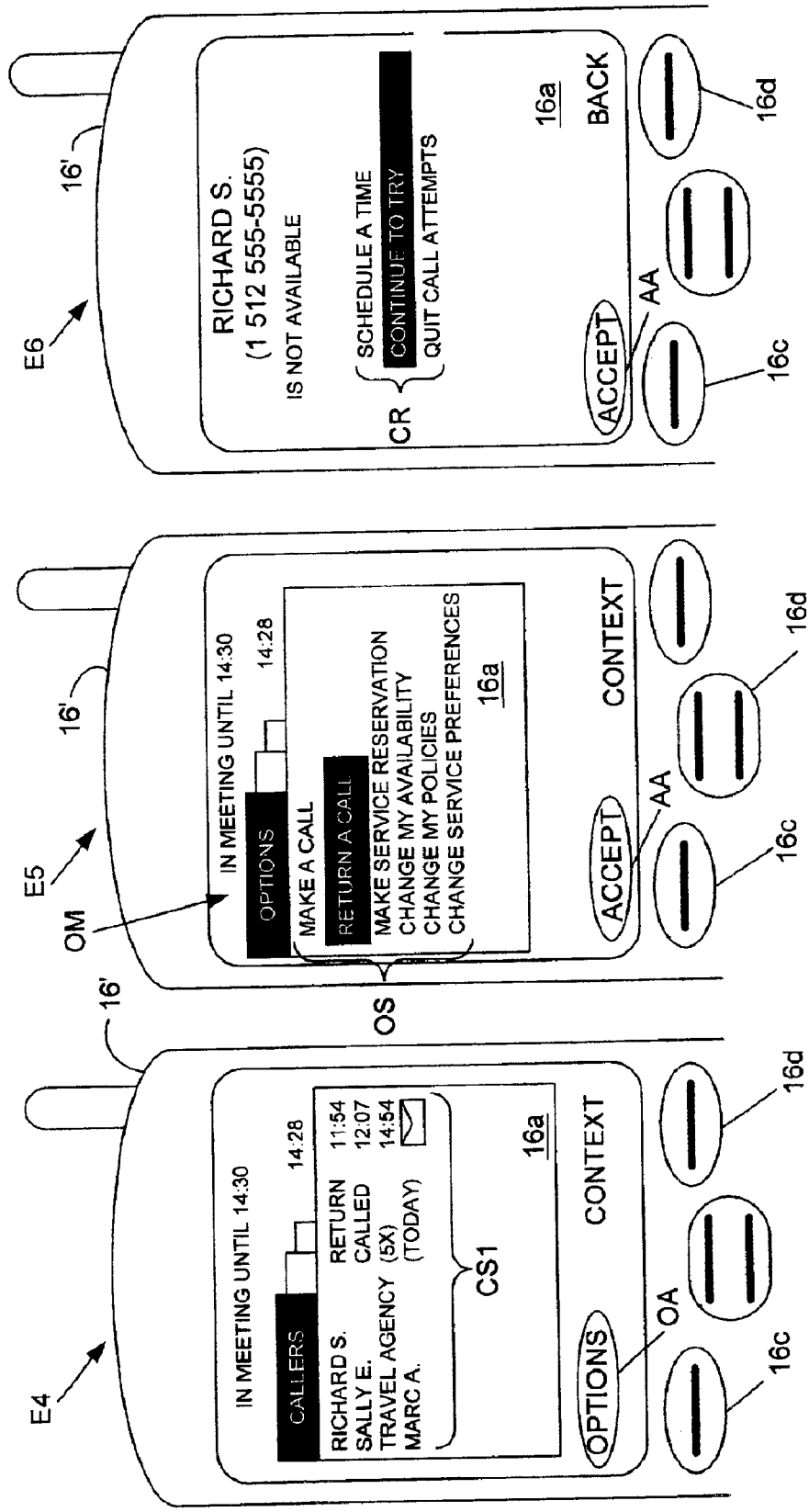
FIG. 12 is a diagrammatic view depicting an embodiment of a sequence of events associated with requesting mediation of an outbound communication using a mobile telephone.

At a fourth interaction event E4, FIG. 12, David recognizes that his meeting is about to end. In reviewing the caller summary CS1, David decides that he would like for the mediation system to facilitate a return call to Sally E. To initiate such an operation, David depresses the control key 16c associated with an options action OA.

In response to depressing the control key 16c associated with the options action, an options menu OM is displayed on the visual display 16a at a fifth interaction event E5. The options menu OM includes a plurality of option selections OS. Examples of option selections OS include make a call, return a call, make a reservation, change my availability, change my policies and change my service preferences.

In response to choosing the 'return a call' option selection, an attempt is made at contacting Sally via her communication device. In the event that Sally answers, the mediation system connects David with Sally. In the event that Sally is not available, a plurality of call resolutions CR is displayed on the visual display at a sixth interaction event E6. The call resolutions CR provide various options when the caller is not available. Examples of call resolutions CR include schedule a call, continue to try, and quit call attempt. David uses the scroll key 16d to select the 'Continue to try' call resolution and confirms this selection by depressing the control key 16c associated with the accept action AA. The mediation continues to contact Sally.

It is desirable and advantageous for a mediated follow-through operation or pending mediated commitment to be modified according to an updated context component. For example, in the case where the availability status of the mediation subscriber changes, it is desirable and advantages for in-progress mediation operations and pending mediated commitments to be dynamically adjusted as necessary. The apparatus, methods and systems disclosed herein are capable of supporting such dynamic adjustment.

The 'schedule a call' call resolution depicted in FIG. 12 is one embodiment of a call resolution for mediating a coordinated arrangement for person-to-person communication to be facilitated. In such an embodiment, the mediation system mediates an agreed upon time and/or day for the mediation subscriber and the mediated party to communicate.

Figure 13A:
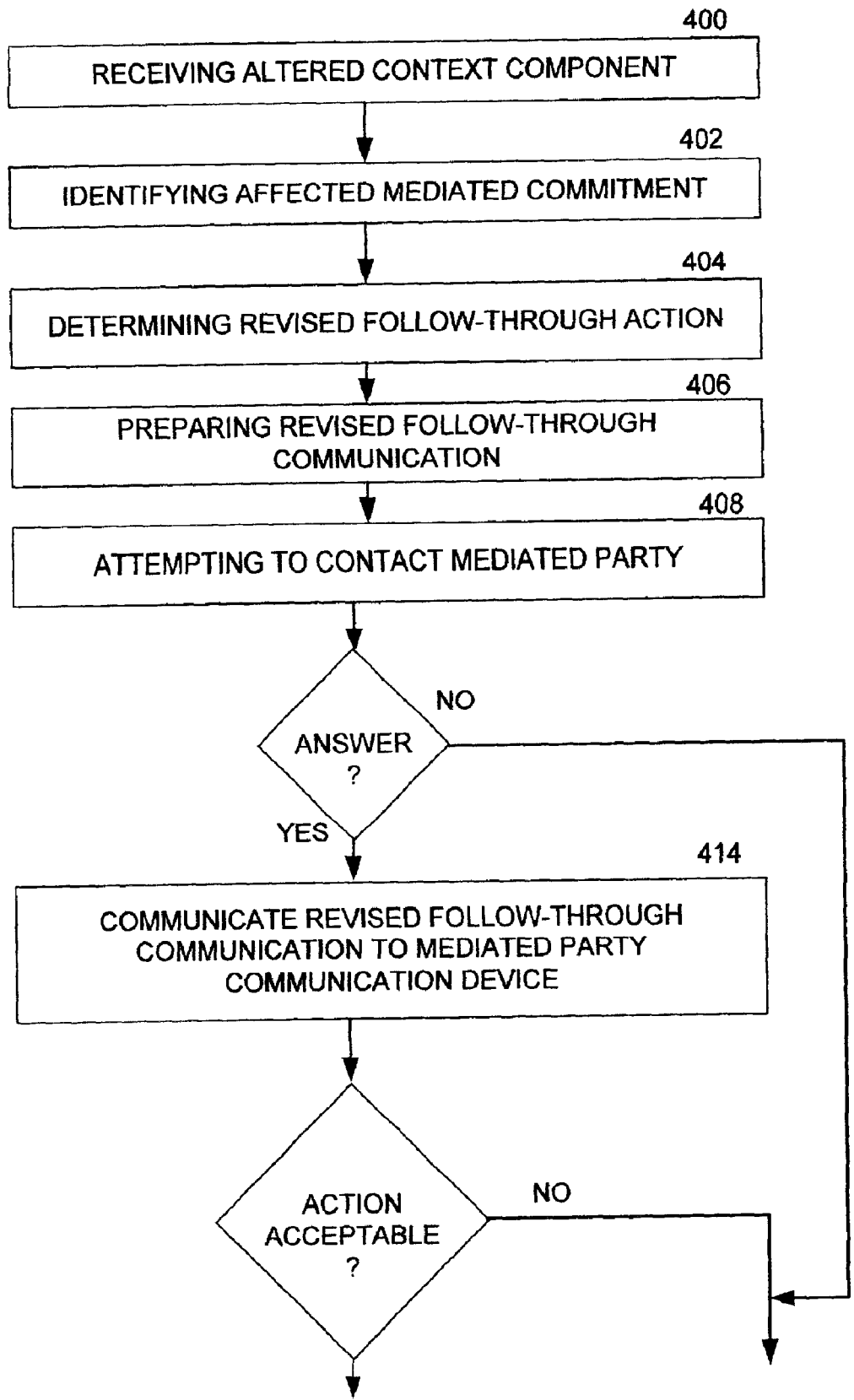
FIG. 13 is a flow chart view depicting an embodiment of a method for performing a mediated follow-through operation to alter a pending mediated commitment in response to one or more context components being altered.
Figure 13B:
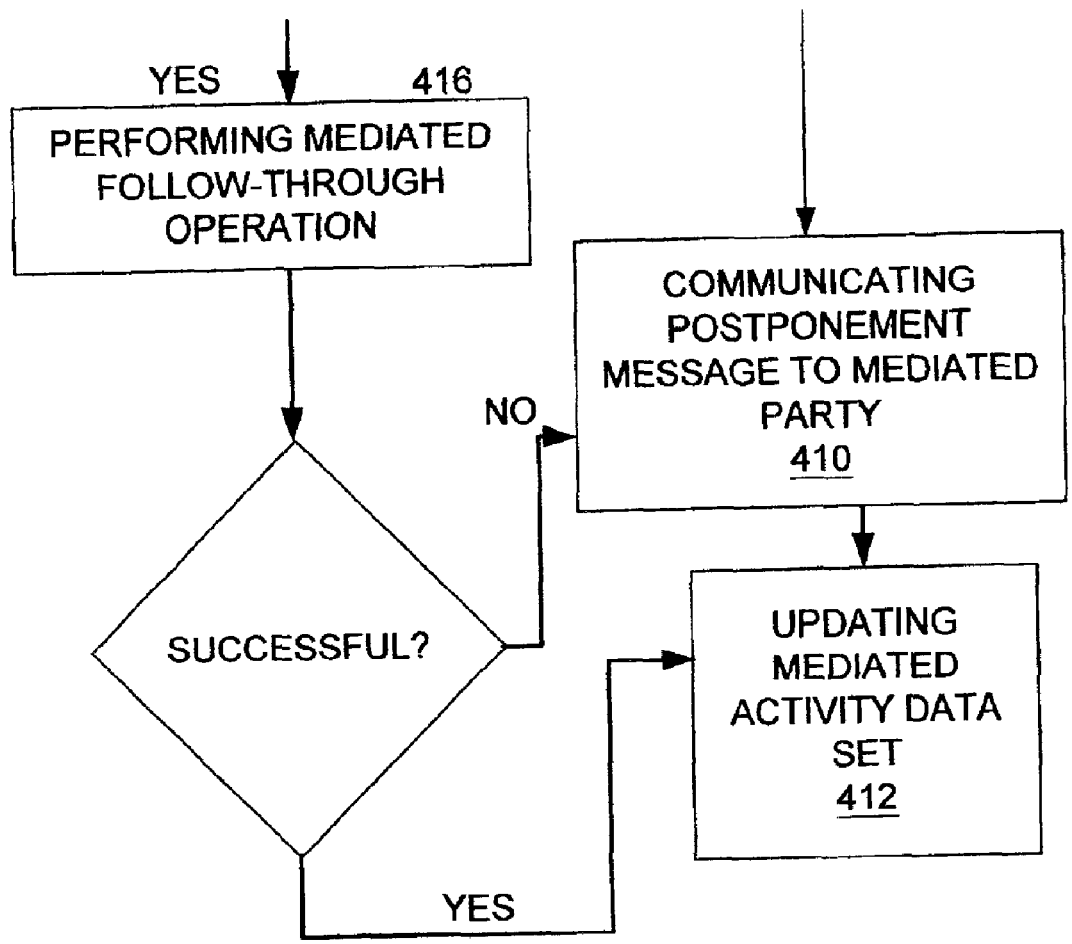

FIG. 13 depicts an embodiment of a method for facilitating a mediation session to alter a pending mediated commitment in response to one or more context components being altered. The apparatus 20, FIG. 2, illustrates an example of an apparatus capable of carrying out the method depicted in FIG. 13. Information may be communicated between the mediation subscriber communication device and the mediation system via data packets over a suitable network.

At a block 400, an altered context component is received by the mediation system. The altered context component may be received from the mediation subscriber or the mediated party. At a block, 402 an affected mediated commitment is identified. A revised availability status illustrates an example of the altered context component capable of affecting a mediated commitment. A revised follow-through action is determined and a follow-through communication is prepared at a block 404 and at a block 406, respectively. At a block 408, an attempt is made at contacting the mediated party via the mediated party communication device.

It should be understood that one or more context components and/or mediated commitments could be affected simultaneously. Therefore, at the block 400, more than one altered context component may be received. Also, the particular revised follow-through actions included in the follow-through action summary may vary depending on the specific context components and/or mediated commitments affected.

In response to the mediated party not being contacted, a postponement message is communicated to a mediated party messaging service at a block 410, if available. Voice mail and an answering machine illustrate suitable examples of the mediated party messaging service. At a block 412 the mediation activity data set 35d, FIG. 7, is updated to reflect that the mediated commitment has been postponed.

In response to the mediated party being contacted, the revised follow-through communication is communicated to the mediated party communication device at a block 414. In response to the revised follow-through action being unacceptable to the mediated party, the method would proceed from the block 414 to the block 410, thus resulting in the mediated commitment being postponed. The method then proceeds to the block 412 where the mediation activity data set 35d, FIG. 7, is updated to reflect that the mediated commitment has been changed. In response to the revised follow-through action being acceptable to the mediated party, at a block 416, the mediated follow-through operation is performed according to the altered context component is facilitated.

In response to the mediated follow-through operation successfully producing an altered mediated commitment, the method proceeds to the block 412 where the mediation activity data set 35d, FIG. 7, is updated to reflect that the mediated commitment has been changed. In response to the mediated follow-through operation being unsuccessful at producing an altered mediated commitment, a postponement message is communicated to a mediated party at a block 410. The method then proceeds to the block 412. The mediated party being unable to commit to a mutually acceptable time to talk illustrates an example of the mediated follow-through operation being unsuccessful.

Example 4—Mediated Commitment Dynamic Updating

Figure 14:
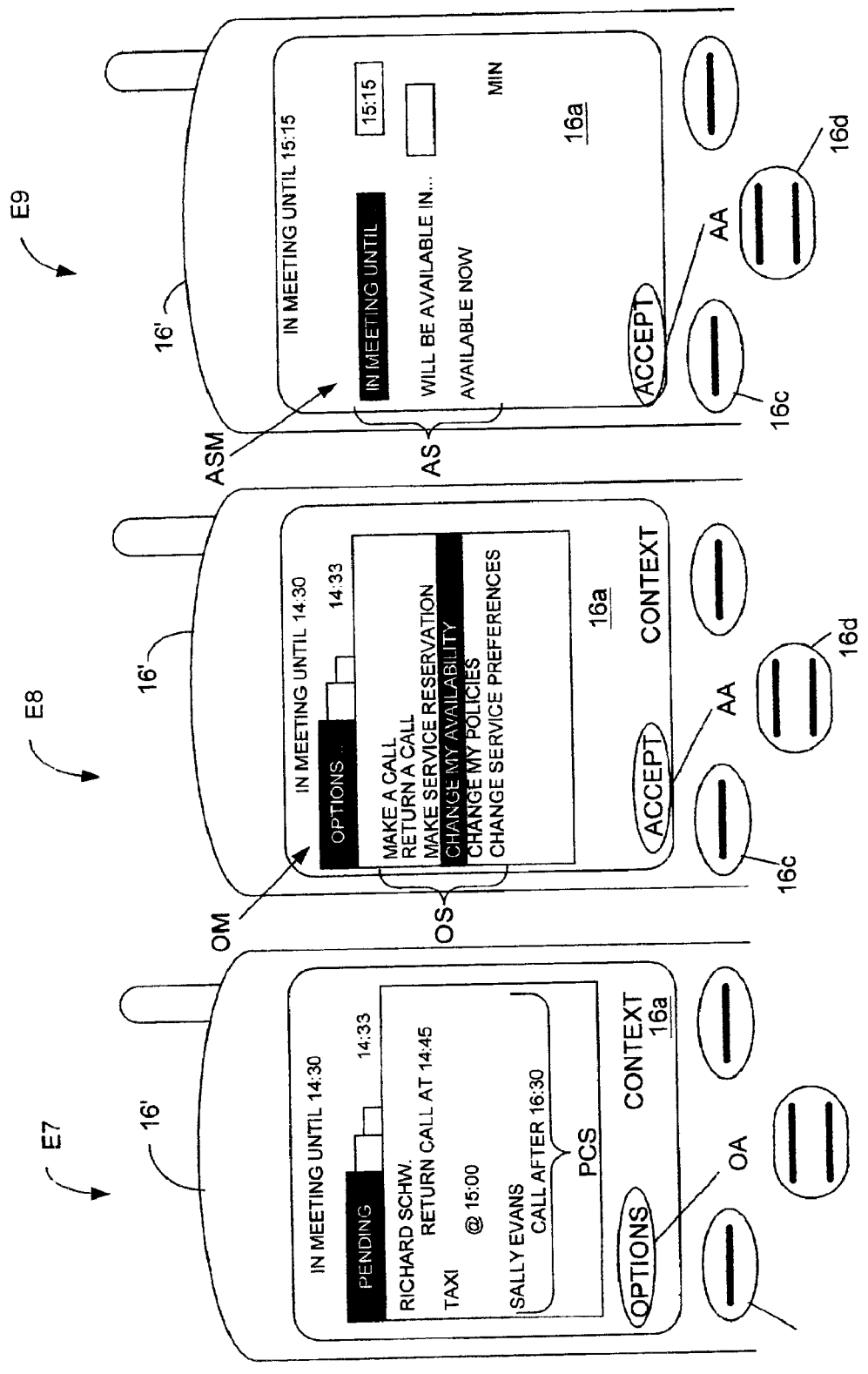
FIG. 14 is a diagrammatic view depicting an embodiment of a sequence of events for altering an availability stat us using a mobile telephone.

At a seventh interaction event E7, FIG. 14, David is still in his meeting, reviewing a pending commitment summary POS displayed on the visual display 16a of his wireless telephone, when he notices that his meeting has run longer than expected. The pending commitment summary PCS indicates that David has a number of pending mediated commitments that are based on his meeting being over by about 14:30 hours. David also notices that the meeting has run longer than the time specified according to his availability status, FIG. 3. Accordingly, David selects the control key associated with the options action OA such that the options menu OM is displayed at an eighth interaction event E8. David then uses the scroll key 186 to highlight the 'Change my availability' options selection and confirms the selection by depressing the control key 16c associated with the accept action AA.

In response to selecting the choosing the 'Change my availability' options selection OS, the availability status menu ASM is displayed on the visual display at a ninth interaction event E9. David uses the scroll key 16d to select the 'In meeting until . . .' availability specifier, enters a new time for when he will be out of the meeting, and confirms the new availability status by depressing the control key 16c associated with the accept action AA.

In response to altering his availability status, the mediation system identifies the pending mediated commitments associated with the availability status. The mediation system then acts on behalf of David to contact the appropriate mediated parties to revise the mediated commitments according to the altered availability status. As revised mediated commitments are established, David is able to review them via the pending commitment summary PCs.

Figure 15:
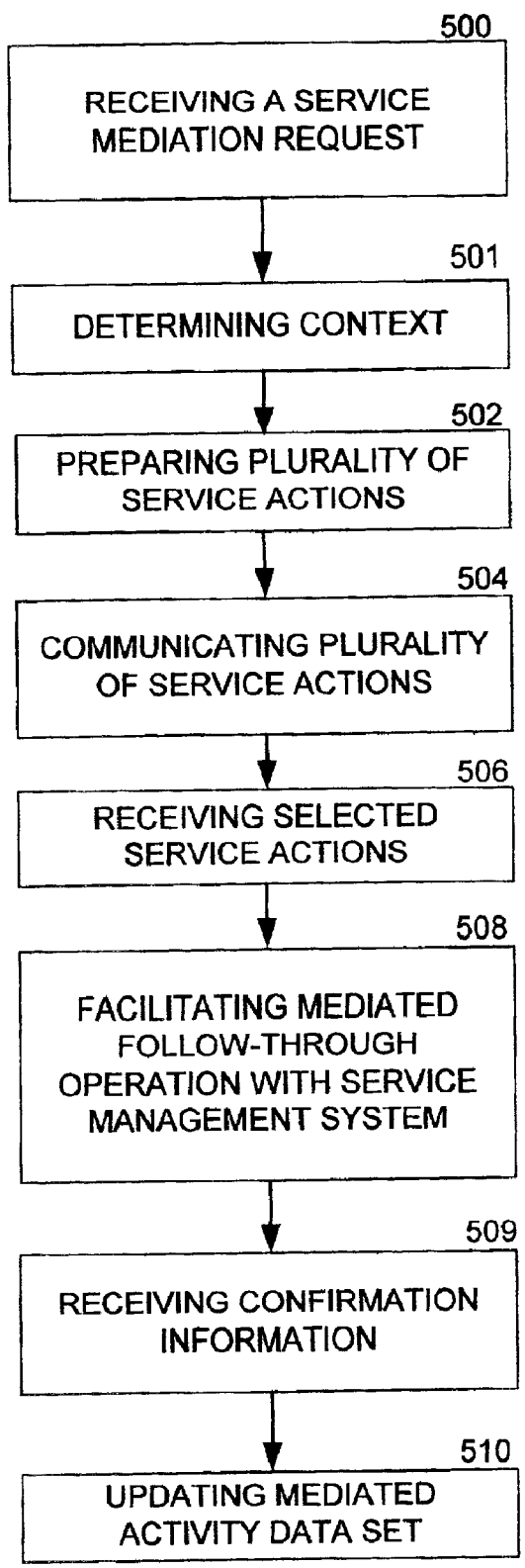
FIG. 15 is a flow chart view depicting an embodiment of a method for facilitation a mediation session for making a mediated service commitment.

FIG. 15 depicts an embodiment of a method for performing a mediation session to set-up a mediated service commitment. The apparatus 20, FIG. 2, illustrates an example of an apparatus capable of carrying out the method depicted in FIG. 15. Information may be communicated between the mediation subscriber communication device and the mediation system via data packets over a suitable network. At a block 500, a service mediation request is received by the mediation system 10 from the mediation subscriber communication device 16. In response to receiving the service mediation request, a context is determined and a plurality of service actions is prepared at a block 501 and a block 502, respectively. In other embodiments, one or no service actions are prepared. At a block 504, the plurality of service actions is communicated to the mediation subscriber communication device 16.

In response to receiving, at a block 506, a selected one of the service actions from the mediation subscriber communication device 16, a mediated follow-through operation is facilitated with the service provider at a block 508. At a block 509, confirmation information, such as a confirmation code, associated with the service reservation is received from the service provider reservation system.

At a block 510, in response to completing the mediated follow-through operation, the mediated activity data set, FIG. 7, is updated. Updating the mediated activity data set includes adding information associated with the mediated service request, such as a confirmation number and a telephone number of the service provider, to the data set.

Figure 16:
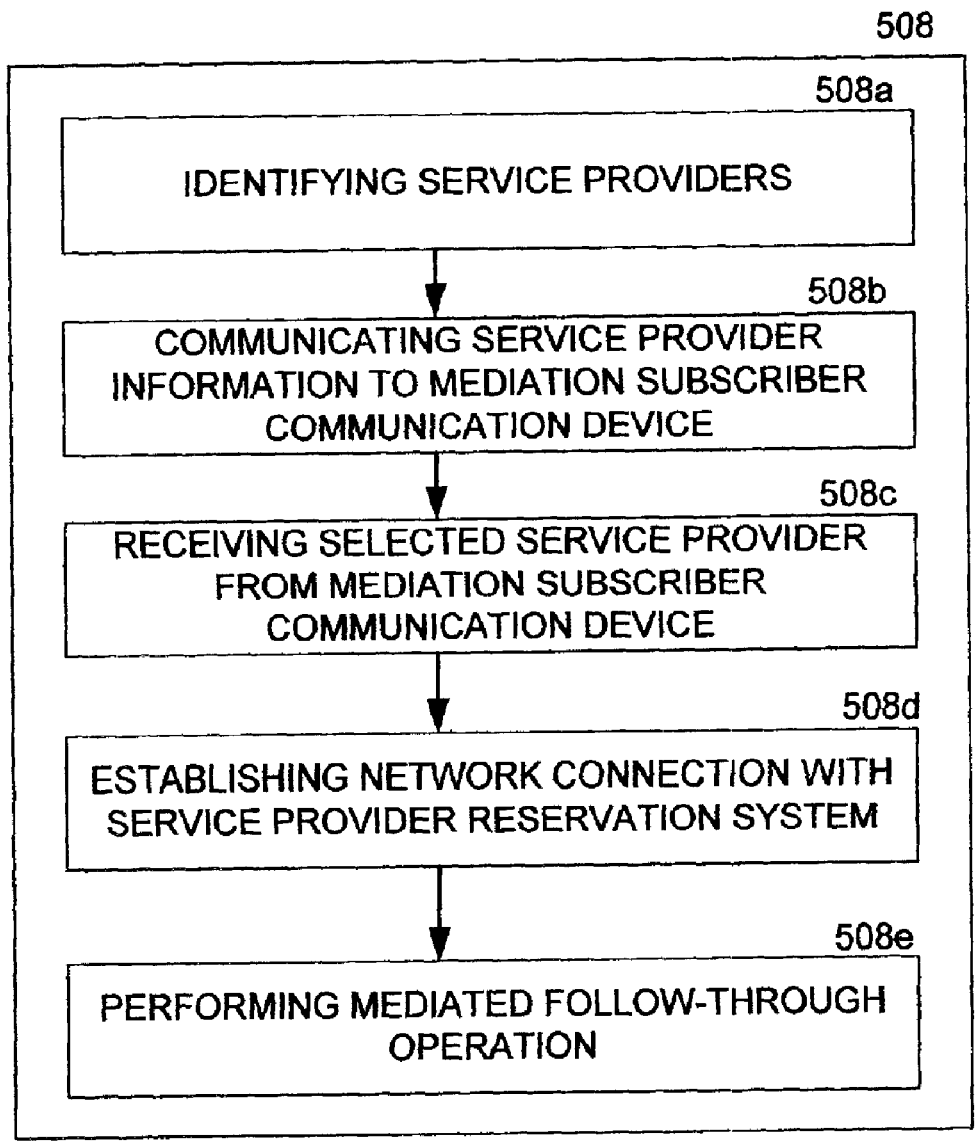
FIG. 16 is a flow chart view depicting an embodiment of a method of facilitating a mediated follow-through operation with a service management system.

FIG. 16 depicts an embodiment of a method for accomplishing the operation of facilitating the mediated follow-through operation, as depicted at the block 508 in FIG. 15. At a block 508a, a plurality of service providers capable of providing the requested service is identified. In other embodiments, only one service provider is identified. At a block 508b, the identified service providers are communicated to the mediation subscriber communication device 16. After communicating the plurality of service providers to the mediation subscriber communication device, confirmation of a selected service provider is received, at a block 508c, from the mediation subscriber communication device.

At a block 508d, a network connection is established between the service provider reservation system and the mediation system through the computer network. At a block 508e, the mediated follow-through operation is performed, thus establishing a mediated service commitment. The mediated service commitment illustrates an example of a mediated commitment, as discussed above. It is contemplated that communication between the mediation system and the service management system may be facilitated via the computer network and the voice network.

Accordingly, data-based communication and voice-based communication may be used for facilitating the mediated service operation at the block 508e. For example, the mediation system may complete a first portion of the mediated follow-through operation via data-based communication through the computer network and a second portion of the mediated follow-through operation via voice-based communication the through the voice network. A combined use of data-based communication and voice-based communication is defined herein to be a mixed-mode communication.

Example 5—Service Mediation

David decides to make a reservation at his favorite restaurant to be sure he gets seated for dinner without too long of a wait. He was expecting to get there before the dinner crowd. However, because his meeting ran over, he thinks he may now have a hard time getting a seat.

Figure 17:
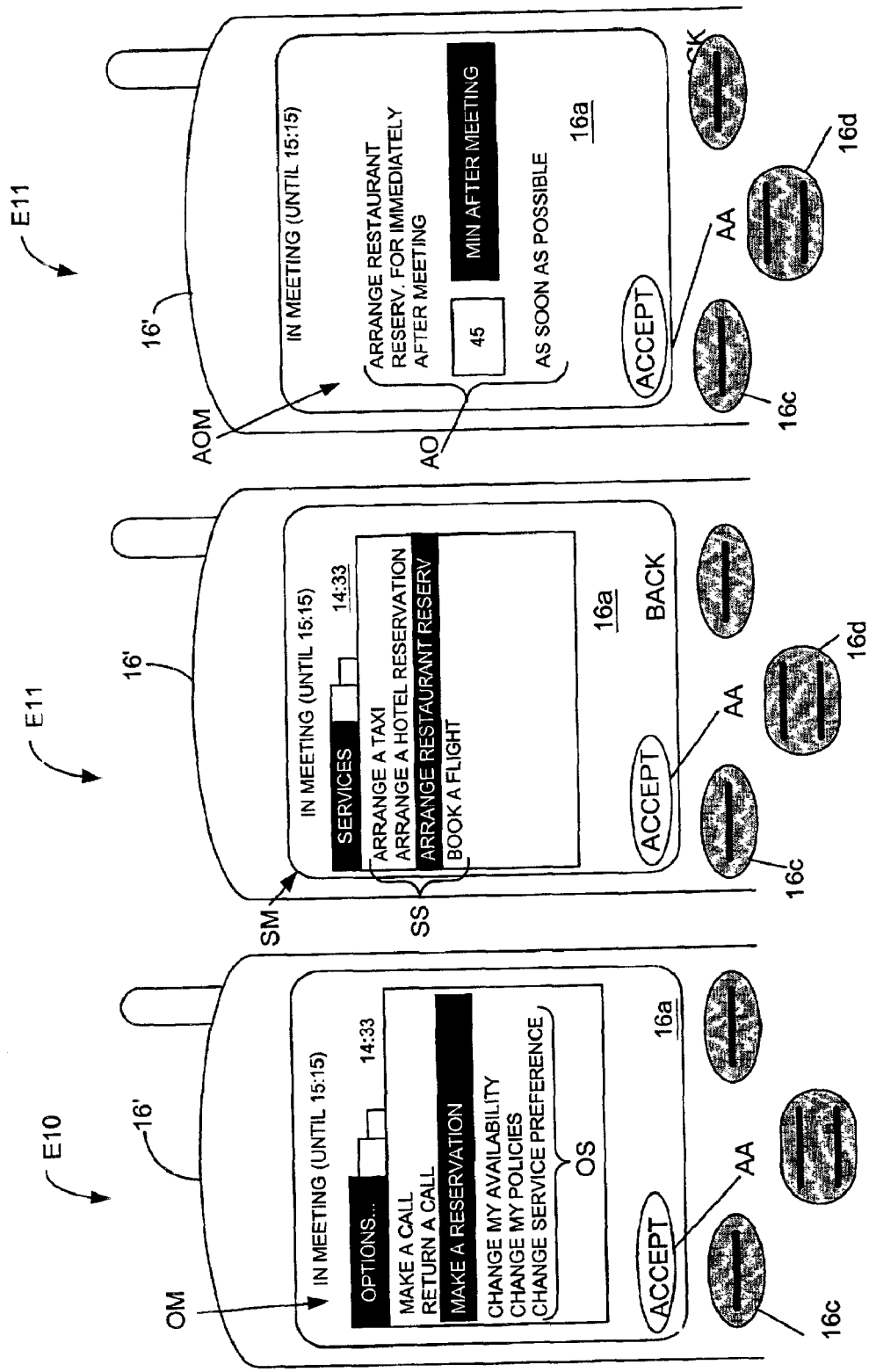
FIG. 17 is a diagrammatic view depicting an embodiment of a sequence of events for requesting a mediated service commitment using a mobile telephone.

Accordingly, at a tenth interaction event E10, FIG. 17, David brings up the options menu OM on the visual display 16a of his wireless telephone 16'. David uses the scroll key 16d to choose the 'Make a reservation' option selection and confirms his selection by depressing the control key 16c associated with the accept action AA. In response to choosing the 'Make a reservation' option selection, a service menu is on the visual display 16a at an eleventh interaction event E11. The service menu SM includes a plurality of service selections. Examples of service selections SS include arrange a taxi, arrange a hotel reservation, arrange a restaurant reservation and book a flight.

David uses the scroll key 16d to select the 'Arrange a restaurant reservation' service selection and confirms the selection by depressing the control key 16c associated with the accept action AA. In response to choosing the 'Arrange a restaurant reservation' service selection, an arrangement option menu AOM is displayed on the visual display at a twelfth interaction event E12. The arrangement option menu AOM includes a plurality of arrangement options AO.

Each service selection SS has one or more corresponding context-specific arrangement options. Accordingly, the arrangement options AO displayed in response to choosing the 'arrange a restaurant reservation' service action are specific to arranging the taxi and are based on the present availability of the mediation subscriber. Because the mediation system knows that the mediation subscriber is in a meeting, the context derived from being in a meeting until a specified time is used to add a contextual aspect to some of the arrangement options AO. In this example, in which David is in a meeting until 15:15 hours, context-specific service actions include arranging a taxi for immediately after the meeting, arrange a taxi for X minutes after the meeting arranging a restaurant reservation Y minutes after the meeting and booking a flight Z hours after the meeting. In this manner, a mediated service commitment may be acted on in a more specific fashion.

David uses the scroll key 16d to select the '. . . min after meeting' arrangement option, enters 45 minutes in the corresponding time field and confirms this selection and entry by depressing the control key 16c associated with the accept action AA. In response to confirming this selection and entry, the mediation system identifies the restaurant, contacts a service management system of the restaurant and mediates the requested reservation on David's behalf according to the arrangement option specified by David. The mediation system contacts the service management system of the restaurant, such as via the Internet or via an automated or actual voice communication, for facilitating mediation of the reservation. Information associated with the restaurant are provided manually by David, garnished from the service provider preference data set in David's profile (FIG. 7) or a combination of such information input techniques. Once the reservation is confirmed by the mediation system, David is able to review it via the pending commitment summary PCS discussed in reference to FIG. 14.

Embodiments of the systems, apparatus and methods disclosed herein provide advantageous and beneficial results relative to conventional mediation solutions. Such embodiments use all appropriate and available resources to interact with a mediated party. It does not depend on the mediated party being a mediation subscriber or having a smart phone. The device independent nature, with respect to the mediate party, places few restrictions on the breadth of communication. Furthermore, mediation is carried out in a very similar manner, as would mediation done personally by the mediation subscriber.

The methods disclosed herein negotiate with mediated parties with the ultimate goal of connecting the two parties. Connecting the two parties may be via a scheduled telephone call or a mediated service commitment such as a taxi reservation. The objective of the mediation system is to continually and dynamically act on the behalf of the mediation subscriber when the mediation subscriber cannot personally participate in a dynamic, personal and time-consuming manner. To this end, one aspect is the ability to identify and analyze contextual information associated with the mediation subscriber and the mediated party. Accordingly, advantageous and beneficial results are achieved as a result of separating the availability individuals from the availability of their respective communication devices.

Some types of the mediation subscriber communications devices, such as smart phones, include data processing capabilities. For example, some smart phones are capable of running JAVA-based programs. It is contemplated that such data processing capabilities will permit at least a portion of the operations and steps of the methods disclosed herein to be performed by the mediation subscriber communication device acting as the mediation system rather than solely by a separate mediation system. For example, in some instances, it may be desirable and advantageous for all or some menu follow-through actions to be prepared by the mediation subscriber communication device 16.

The various functions and components in the present application may be implemented using an information handling machine such as a data processor, or a plurality of data processing devices. Such a data processor may be a microprocessor, microcontroller, microcomputer, digital signal processor, state machine, logic circuitry, and/or any device that manipulates digital information based on operational instruction, or in a predefined manner. Generally, the various functions, and systems represented by block diagrams herein are readily implemented by one of ordinary skill in the art using one or more of the implementation techniques listed herein.

When a data processor for issuing instructions is used, the instructions may be stored in memory. Such a memory may be a single memory device or a plurality of memory devices. Such a memory device may be read-only memory device, random access memory device, magnetic tape memory, floppy disk memory, hard drive memory, external tape, and/or any device that stores digital information. Note that when the data processor implements one or more of its functions via a state machine or logic circuitry, the memory storing the corresponding instructions may be embedded within the circuitry that includes a state machine and/or logic circuitry, or it may be unnecessary because the function is performed using combinational logic.

Such an information handling machine may be a system, or part of a system, such as a computer, a personal digital assistant (PDA), a hand held computing device, a cable set-top box, an Internet capable device, such as a cellular phone, and the like.

In the preceding detailed description, reference has been made to the accompanying drawings that form a part hereof, and in which are shown by way of illustration specific embodiments in which the invention may be practiced. These embodiments and certain variants thereof, have been described in sufficient detail to enable those skilled in the art to practice the invention. It is to be understood that other suitable embodiments may be utilized and that logical, mechanical, chemical and electrical changes may be made without departing from the spirit or scope of the invention. For example, functional blocks shown in the figures could be further combined or divided in any manner without departing from the spirit or scope of the invention. To avoid unnecessary detail, the description may omit certain information known to those skilled in the art. The preceding detailed description is, therefore, not intended to be limited to the specific forms set forth herein, but on the contrary, it is intended to cover such alternatives, modifications, and equivalents, as can be reasonably included within the spirit and scope of the appended claims.

What is claimed is:

1. A method for facilitating mediated virtual communication, comprising:

receiving, by a mediation system, a request for voice-based communication from a communication device of a calling party, wherein the request for voice-based communication requests commencement of a telephone call between the communication device of the calling party and a communication device of a called party, the request for voice-based communication received regardless of a usage status of the communication device of the called party;

automatically evaluating, by the mediation system, contextual information associated with the telephone call, in response to receiving the-request for voice-based communication;

automatically preparing, by the mediation system, a list of follow-through options, based on the contextual information;

automatically transmitting a message from the mediation system to the communication device of the called party, wherein the message includes the list of follow-through options to be displayed on the communication device of the called party for selection by the called party;

receiving, by the mediation system, a response from the communication device of the called party, wherein the response identifies one of the follow-through options as having been selected by the called party;

automatically updating a data set in a mediation subscriber profile for the called party in response to receiving the response identifying the selected one of the follow-through options, wherein the updating includes archiving at least one of:

identifying information of the calling party;

an availability status of the called party during a mediation process for the request for voice-based communication; and information about the follow-through option selected by the called party during the mediation process; and facilitating a mediated follow-through operation based on the selected one of the follow-through options.

2. The method of claim 1, wherein the operation of evaluating the contextual information comprises:

determining a present availability status for the called party.

3. The method of claim 1, further comprising:

determining an availability status for the calling party.

4. The method of claim 1, wherein:

the selected follow-through action comprises an option to automatically notify the calling party that the called party plans to call the calling party back later; and the operation of facilitating a mediated follow-through operation based on the selected one of the follow-through options comprises automatically notifying the calling party that the called party plans to call the calling party back later.

5. The method of claim 4, further comprising:

after notifying the calling party that the called party plans to call the calling party back later, receiving, by the mediation system, a communication request from the communication device of the called party;

automatically preparing, by the mediation system, a list of follow-through actions, in response to the communication request;

transmitting a text-based message from the mediation system to the communication device of the called party, such that the text-based message causes the communication device of the called party to display the list of follow-through actions for selection by the called party;

receiving, by the mediation system, a response from the communication device of the called party, wherein the response identifies one of the follow-through actions as having been selected by the called party; and automatically facilitating the selected follow-through action, in response to receiving the response from the communication device of the called party.

6. The method of claim 5, wherein:

the selected follow-through action comprises an option to return a call; and the operation of automatically facilitating the selected follow-through action comprises:

automatically calling the communication device of a the calling party on behalf of the called party, in response to receiving the response from the communication device of the called party;

automatically determining a present availability status of the calling party by interacting with the calling party; and automatically connecting the communication device of the called party and the communication device of the calling party, to facilitate communication between the called party and the calling party, wherein the mediation system connects the communication device of the called party and the communication device of the calling party only after the mediation system interacts with the calling party and determines that the calling party is available.

7. The method of claim 1, further comprising:

automatically preparing a communication summary in response to receiving the request for voice-based communication from the communication device of the calling party, wherein the communication summary includes identifying information for the calling party; and transmitting the communication summary from the mediation system to the communication device of the called party.

8. The method of claim 7, wherein the communication summary sent to the communication device of the called party comprises information about previous attempts by the calling party to call the called party.

9. The method of claim 1, further comprising:

tracking responses from the called party to multiple communication requests, to identify a recurring response from the called party; and automatically handling a subsequent telephone call to the communication device of the called party on behalf of the called party, in accordance with the recurring response, without receiving input from the called party pertaining to the subsequent call.

10. The method of claim 1, further comprising:

receiving input from the called party specifying a default option for mediating incoming calls for the called party; and automatically mediating an incoming call to the communication device of the called party on behalf of the called party, in accordance with the default option, without receiving input from the called party pertaining specifically to that incoming call.

11. The method of claim 10, wherein the operation of automatically mediating an incoming call in accordance with the default option comprises:

automatically providing instructions to a person that originated the incoming call, wherein the instructions pertain to leaving voice mail for the called party.

12. The method of claim 10, wherein the operation of automatically mediating an incoming calls in accordance with the default option comprises:

automatically mediating the incoming call in accordance with a behavior-specific follow-through action.

13. The method of claim 10, wherein the operation of automatically mediating an incoming call in accordance with the default option comprises:

automatically interacting with a person that originated the incoming call, on behalf of the called party, to schedule a follow-up call.

14. A program product for facilitating mediated virtual communication, the program product comprising:

a computer-usable medium; and computer instructions encoded in the computer-usable medium, wherein the computer instructions, when executed by a processor in a computer system, provide a mediation system that performs operations comprising:

receiving a request for voice-based communication from a communication device of a calling party, wherein the request for voice-based communication requests commencement of a telephone call between the communication device of the calling party and a communication device of a called party, the request for voice-based communication received regardless of a usage status of the communication device of the called party;

automatically evaluating contextual information associated with the telephone call, in response to receiving the request for voice-based communication;

automatically preparing a list of follow-through options, based on the contextual information;

automatically transmitting a message from the mediation system to the communication device of the called party, wherein the message includes the list of follow-through options to be displayed on the communication device of the called party for selection by the called party;

receiving a response from the communication device of the called party, wherein the response identifies the selected follow-through option as an option to automatically notify the calling party that the called party plans to call the calling party back later;

automatically updating a data set in a mediation subscriber profile for the called party in response to receiving the response identifying the selected one of the follow-through options, wherein the updating includes archiving at least one of:

identifying information of the calling party;

an availability status of the called party during a mediation process for the request for voice-based communication; and information about the follow-through option selected by the called party during the mediation process; and facilitating a mediated follow-through operation based on the selected one of the follow-through options by automatically notifying the calling party that the called party plans to call the calling party back later.

15. A program product according to claim 14, wherein the operations performed by the computer instructions further comprise:

after notifying the calling party that the called party plans to call the calling party back later, receiving a communication request from the communication device of the called party;

automatically preparing a list of follow-through actions, in response to the communication request;

transmitting a text-based message from the mediation system to the communication device of the called party, such that the text-based message causes the communication device of the called party to display the list of follow-through actions for selection by the called party;

receiving a response from the communication device of the called party, wherein the response identifies one of the follow-through actions as having been selected by the called party; and automatically facilitating the selected follow-through action, in response to receiving the response from the communication device of the called party.

16. A program product according to claim 15, wherein:

the selected follow-through action comprises an option to return a call; and the operation of automatically facilitating the selected follow-through action comprises:

automatically calling the communication device of a the calling party on behalf of the called party, in response to receiving the response from the communication device of the called party;

automatically determining a present availability status of the calling party, based on interactions between the calling party and the mediation system; and automatically connecting the communication device of the called party and the communication device of the calling party, to facilitate communication between the called party and the calling party, wherein the mediation system connects the communication device of the called party and the communication device of the calling party only after the mediation system interacts with the calling party and determines that the calling party is available.

17. A program product according to claim 14, wherein the operations performed by the computer instructions further comprise:

automatically preparing a communication summary in response to receiving the request for voice-based communication from the communication device of the calling party, wherein the communication summary includes identifying information for the calling party; and transmitting the communication summary from the mediation system to the communication device of the called party.

18. A program product according to claim 17, wherein the communication summary sent to the communication device of the called party comprises information about previous attempts by the calling party to call the called party.

19. A program product according to claim 14, wherein the operations performed by the computer instructions further comprise:

tracking responses from the called party to multiple communication requests, to identify a recurring response from the called party; and automatically handling a subsequent telephone call to the communication device of the called party on behalf of the called party, in accordance with the recurring response, without receiving input from the called party pertaining to the subsequent call.

20. A program product according to claim 14, wherein the operations performed by the computer instructions further comprise:

receiving input from the called party specifying a default option for mediating incoming calls for the called party; and automatically mediating an incoming call to the communication device of the called party on behalf of the called party, in accordance with the default option, without receiving input from the called party pertaining specifically to that incoming call.

21. A program product according to claim 20, wherein the operation of automatically mediating an incoming call in accordance with the default option comprises:
   automatically providing instructions to a person that originated the incoming call, wherein the instructions pertain to leaving voice mail for the called party.

22. A program product according to claim 20, wherein the operation of automatically mediating an incoming call in accordance with the default option comprises:
   automatically mediating the incoming call in accordance with a behavior-specific follow-through action.

23. A program product according to claim 20, wherein the operation of automatically mediating an incoming call in accordance with the default option comprises:
   automatically interacting with a person that originated the incoming call, on behalf of the called party, to schedule a follow-up call.

24. A program product for facilitating mediated virtual communication, comprising:
   a computer-usable medium; and
   computer instructions encoded in the computer-usable medium, wherein the computer instructions, when executed by a processor in a computer system, provide a mediation system that performs operations comprising:
   receiving a communication request from a communication device of a user;
   automatically preparing a list of follow-through actions, in response to the communication request;
   transmitting a text-based message from the mediation system to the communication device of the user, such that the text-based message causes the communication device to display the list of follow-through actions for selection by the user, wherein the list of follow-through actions comprises an option to return a call;
   receiving a response from the communication device of the user, wherein the response identifies the option to return a call as having been selected by the user;
   automatically updating a data set in a mediation subscriber profile for the user in response to receiving the response identifying the option to return a call as having been selected by the user, wherein the updating includes archiving at least one of:
      identifying information of a second person;
      an availability status of the user during a mediation process for the communication request; and
      information about the follow-through option selected by the user during the mediation process; and
   automatically facilitating the selected follow-through action, in response to receiving the response from the communication device of the user, by:
   automatically calling a communication device of the second person on behalf of the user, in response to receiving the response from the communication device of the user;
   automatically determining a present availability status of the second person by interacting with the second person on behalf of the user; and
   in response to determining that the second person is available, automatically connecting the communication device of the user and the communication device of the second person, to facilitate communication between the user and the second person, wherein the mediation system connects the communication device of the user and the communication device of the second person only after the mediation system interacts with the second person and determines that the second person is available.

25. A program product according to claim 24, wherein the operation of receiving a response from the communication device of the user comprises:
   receiving a text-based response from the communication device of the user, wherein the text-based response identifies the selected follow-through action.

26. A method for facilitating mediated virtual communication, comprising:
   receiving, by a mediation system, a communication request from a communication device of a user;
   automatically preparing, by the mediation system, a list of follow-through actions, in response to the communication request;
   transmitting a text-based message from the mediation system to the communication device of the user, such that the text-based message causes the communication device to display the list of follow-through actions for selection by the user, wherein the list of follow-through actions comprises an option to return a call;
   receiving, by the mediation system, a response from the communication device of the user, wherein the response identifies the option to return a call as having been selected by the user;
   automatically updating a data set in a mediation subscriber profile for the user in response to receiving the response identifying the option to return a call as having been selected by the user, wherein the updating includes archiving at least one of:
      identifying information of a second person;
      an availability status of the user during a mediation process for the request for voice-based communication; and
      information about the follow-through option selected by the user during the mediation process; and
   automatically facilitating the selected follow-through action, in response to receiving the response from the communication device of the user, by:
   automatically calling a communication device of the second person on behalf of the user, in response to receiving the response from the communication device of the user;
   automatically determining a present availability status of the second person by interacting with the second person on behalf of the user, and
   in response to determining that the second person is available, automatically connecting the communication device of the user and the communication device of the second person, to facilitate communication between the user and the second person, wherein the mediation system connects the communication device of the user and the communication device of the second person only after the mediation system interacts with the second person and determines that the second person is available.

27. The method of claim 26, wherein the operation of automatically preparing a list of follow-through actions comprises:
- automatically analyzing a profile for the user, in response to receiving the communication request; and
- preparing the list of follow-through actions, based on the profile for the user.

28. The method of claim 26, further comprising:
- automatically determining a present availability status for the user, in response to receiving the communication request from the communication device of the user.

29. The method of claim 26, wherein the operation of receiving the response from the communication device of the user comprises:
- receiving, by the mediation system, a text-based response from the communication device of the user, wherein the text-based response identifies the selected follow-through action.

* * * * *